(12) United States Patent
Ma et al.

(10) Patent No.: US 12,238,343 B2
(45) Date of Patent: Feb. 25, 2025

(54) VIDEO CODING WITH NEURAL NETWORK BASED IN-LOOP FILTERING

(71) Applicant: BEIJING DAJIA INTERNET INFORMATION TECHNOLOGY CO., LTD., Beijing (CN)

(72) Inventors: Tsung-Chuan Ma, Beijing (CN); Wei Chen, Beijing (CN); Xiaoyu Xiu, Beijing (CN); Yi-Wen Chen, Beijing (CN); Hong-Jheng Jhu, Beijing (CN); Che-Wei Kuo, Beijing (CN); Xianglin Wang, Bejing (CN); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 6 days.

(21) Appl. No.: 18/193,763

(22) Filed: Mar. 31, 2023

(65) Prior Publication Data

US 2023/0319314 A1 Oct. 5, 2023

Related U.S. Application Data

(63) Continuation of application No. PCT/US2021/052915, filed on Sep. 30, 2021.
(Continued)

(51) Int. Cl.
*H04N 19/82* (2014.01)
*H04N 19/186* (2014.01)

(52) U.S. Cl.
CPC ........... *H04N 19/82* (2014.11); *H04N 19/186* (2014.11)

(58) Field of Classification Search
CPC .......... G06N 3/044; G06N 3/045; G06N 3/08; H04N 19/186; H04N 19/82
See application file for complete search history.

(56) References Cited

U.S. PATENT DOCUMENTS

2019/0108618 A1   4/2019   Hwang et al.
2019/0246102 A1*  8/2019   Cho .................... G06N 3/045
(Continued)

FOREIGN PATENT DOCUMENTS

EP         3930323 A1 * 12/2021   ........... H04N 19/117
WO      2020180737 A1    9/2020

OTHER PUBLICATIONS

International Search Report and Written Opinion for PCT/US2021/052915 mailed Jan. 14, 2022, 6 pages.
(Continued)

*Primary Examiner* — Md N Haque
(74) *Attorney, Agent, or Firm* — Myers Bigel, P.A.

(57) ABSTRACT

An electronic apparatus performs a method of decoding video data, including: reconstructing, from a video bitstream, a picture frame that includes a luma component, a first and a second chroma components, and applying a trained neural network based in-loop filter to the reconstructed picture frame by: converting a first resolution of the samples of the at least one of the first and the second chroma components to a second resolution of the samples of the luma component when the first resolution is different from the second resolution; concatenating samples of at least one of the first and the second chroma components with the luma component; processing the concatenated samples using a convolutional neural network; and reconverting the samples of the at least one of the first and the second chroma components processed by the convolutional neural network from the second resolution back to the first resolution.

18 Claims, 30 Drawing Sheets

Related U.S. Application Data

(60) Provisional application No. 63/086,538, filed on Oct. 1, 2020.

(56) References Cited

U.S. PATENT DOCUMENTS

| | | | |
|---|---|---|---|
| 2019/0273948 A1* | 9/2019 | Yin | G06N 3/045 |
| 2020/0213587 A1* | 7/2020 | Galpin | H04N 19/117 |
| 2020/0252654 A1 | 8/2020 | Su et al. | |
| 2021/0136416 A1* | 5/2021 | Kim | H04N 19/176 |

OTHER PUBLICATIONS

Extended European Search Report corresponding to European Application No. 21876491.8 (11 pages) (Oct. 15, 2024).

Hsiao et al. "AHG9: Convolutional neural network loop filter" Joint Video Exports Team (JVET) of ITU-T SG 16 WP 3 and ISO/IEC JTC 1/SC 29/WG 11 (Jan. 2019).

Hsiao et al. "CE10-1. 2: Convolutional neural network loop filter" Joint Video Experts Team (JVET) of ITU-T SG 16 WP 3 and ISO/IEC JTC 1/SC 29/WG 11 (Jul. 2019).

Huang et al. "Frame-Wise CNN-Based Filtering for Intra-Frame Quality Enhancement of HEVC Videos" IEEE Transactions on Circuits and Systems for Video Technology 31(6):2100-2113 (Jun. 2021).

Wang et al. "Attention-Based Dual-Scale CNN In-Loop Filter for Versatile Video Coding" IEEE Access 7:145214-145226 (Sep. 30, 2019).

* cited by examiner (a)

```
reconstructing, from a video bitstream, a picture frame that includes
a luma component, a first chroma component, and a second chroma
component 2610
```

```
applying a trained neural network based in-loop filter to the
reconstructed picture frame 2620 by:
``` converting a first resolution of the samples of the at least one of
the first and the second chroma components to a second
resolution of the samples of the luma component when the first
resolution of the at least one of the first and the second chroma
components is different from the second resolution of the luma
component 2620-1 concatenating the samples of at least one of the first and the
second chroma components with the luma component to create
concatenated samples 2620-2 processing the concatenated samples using a convolutional
neural network 2630-3 reconverting the samples of the at least one of the first and the
second chroma components processed by the convolutional
neural network from the second resolution back to the first
resolution 2630-4

FIG. 26

VIDEO CODING WITH NEURAL NETWORK BASED IN-LOOP FILTERING

RELATED APPLICATION

The present application is a continuation of PCT application no. PCT/US2021/052915, filed Sep. 30, 2021, which claims priority to U.S. Provisional Patent Application No. 63/086,538, entitled "Video Coding with Neural Network Based In-Loop Filtering" filed Oct. 1, 2020, which is incorporated by reference in its entirety.

TECHNICAL FIELD

The present application generally relates to video coding and compression, and more specifically, to methods and apparatus on applying neural network technique on video coding.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit, receive, encode, decode, and/or store digital video data by implementing video compression/decompression standards. Some well-known video coding standards include Versatile Video Coding (VVC), Joint Exploration Test Model (JEM), Moving Picture Expert Group (MPEG) coding, High Efficiency Video Coding (HEVC, also known as H.265 or MPEG-H Part 2) and Advanced Video Coding (AVC, also known as H.264 or MPEG-4 Part 10), which are jointly developed by ISO/IEC MPEG and ITU-T VCEG. AOMedia Video 1 (AV1) was developed by Alliance for Open Media (AOM) as a successor to its preceding standard VP9. Audio Video Coding (AVS), which refers to digital audio and digital video compression standard, is another video compression standard series.

Video compression typically includes performing spatial (intra frame) prediction and/or temporal (inter frame) prediction to reduce or remove redundancy inherent in the video data. For block-based video coding, a video frame is partitioned into one or more slices, each slice having multiple video blocks, which may also be referred to as coding tree units (CTUs). Each CTU may contain one coding unit (CU) or recursively split into smaller CUs until the predefined minimum CU size is reached. Each CU (also named leaf CU) contains one or multiple transform units (TUs) and each CU also contains one or multiple prediction units (PUs). Each CU can be coded in either intra, inter or IBC modes. Video blocks in an intra coded (I) slice of a video frame are encoded using spatial prediction with respect to reference samples in neighboring blocks within the same video frame. Video blocks in an inter coded (P or B) slice of a video frame may use spatial prediction with respect to reference samples in neighboring blocks within the same video frame or temporal prediction with respect to reference samples in other previous and/or future reference video frames.

Spatial or temporal prediction based on a reference block that has been previously encoded, e.g., a neighboring block, results in a predictive block for a current video block to be coded. The process of finding the reference block may be accomplished by block matching algorithm. Residual data representing pixel differences between the current block to be coded and the predictive block is referred to as a residual block or prediction errors. An inter-coded block is encoded according to a motion vector that points to a reference block in a reference frame forming the predictive block, and the residual block. The process of determining the motion vector is typically referred to as motion estimation. An intra coded block is encoded according to an intra prediction mode and the residual block. For further compression, the residual block is transformed from the pixel domain to a transform domain, e.g., frequency domain, resulting in residual transform coefficients, which may then be quantized. The quantized transform coefficients, initially arranged in a two-dimensional array, may be scanned to produce a one-dimensional vector of transform coefficients, and then entropy encoded into a video bitstream to achieve even more compression.

The encoded video bitstream is then saved in a computer-readable storage medium (e.g., flash memory) to be accessed by another electronic device with digital video capability or directly transmitted to the electronic device wired or wirelessly. The electronic device then performs video decompression (which is an opposite process to the video compression described above) by, e.g., parsing the encoded video bitstream to obtain syntax elements from the bitstream and reconstructing the digital video data to its original format from the encoded video bitstream based at least in part on the syntax elements obtained from the bitstream, and renders the reconstructed digital video data on a display of the electronic device.

With digital video quality going from high definition, to 4K×2K or even 8K×4K, the amount of vide data to be encoded/decoded grows exponentially. It is a constant challenge in terms of how the video data can be encoded/decoded more efficiently while maintaining the image quality of the decoded video data.

SUMMARY

The present application describes implementations related to video data encoding and decoding and, more particularly, to methods and apparatus on improving the coding efficiency of video coding and compression, including improving the coding efficiency by applying neural network technique on video coding.

According to a first aspect of the present application, a method of decoding video signal comprises: reconstructing, from a video bitstream, a picture frame that includes a luma component, a first chroma component, and a second chroma component, and applying a trained neural network based in-loop filter to the reconstructed picture frame by concatenating the samples of at least one of the first and the second chroma components with the luma component to create concatenated samples; and processing the concatenated samples using a convolutional neural network.

In some embodiments, applying the trained neural network based in-loop filter to the reconstructed picture frame further comprises: converting a first resolution of the samples of the at least one of the first and the second chroma components to a second resolution of the samples of the luma component when the first resolution of the at least one of the first and the second chroma components is different from the second resolution of the luma component; and reconverting the samples of the at least one of the first and the second chroma components processed by the convolutional neural network from the second resolution back to the first resolution.

In some embodiments, the converting the first resolution of the samples of the at least one of the first and the second chroma components to a second resolution of the samples of the luma component, comprises: up-sampling the samples of at least one of the first and the second chroma components from the first resolution to the second resolution of the samples of the luma component, and wherein the reconverting the samples of the at least one of the first and the second chroma components processed by the convolutional neural network from the second resolution back to the first resolution comprises: down-sampling the samples of the at least one of the first and the second chroma components processed by the convolutional neural network from the second resolution back to the first resolution.

According to a second aspect of the present application, an electronic apparatus includes one or more processing units, memory and a plurality of programs stored in the memory. The programs, when executed by the one or more processing units, cause the electronic apparatus to perform the method of coding video data as described above.

According to a third aspect of the present application, a non-transitory computer readable storage medium stores a plurality of programs for execution by an electronic apparatus having one or more processing units. The programs, when executed by the one or more processing units, cause the electronic apparatus to perform the method of coding video data as described above.

BRIEF DESCRIPTION OF DRAWINGS

The accompanying drawings, which are included to provide a further understanding of the implementations and are incorporated herein and constitute a part of the specification, illustrate the described implementations and together with the description serve to explain the underlying principles. Like reference numerals refer to correspondingparts.

FIGS. 6A and 6B are block diagrams depicting sub-sampled positions used for gradient calculation of different directions, in accordance with some implementations of the present disclosure.

FIG. 26 is a flowchart illustrating an exemplary process of decoding video signal using a neural network based in-loop filter, in accordance with some implementations of the present disclosure.

DETAILED DESCRIPTION

Figure 1:
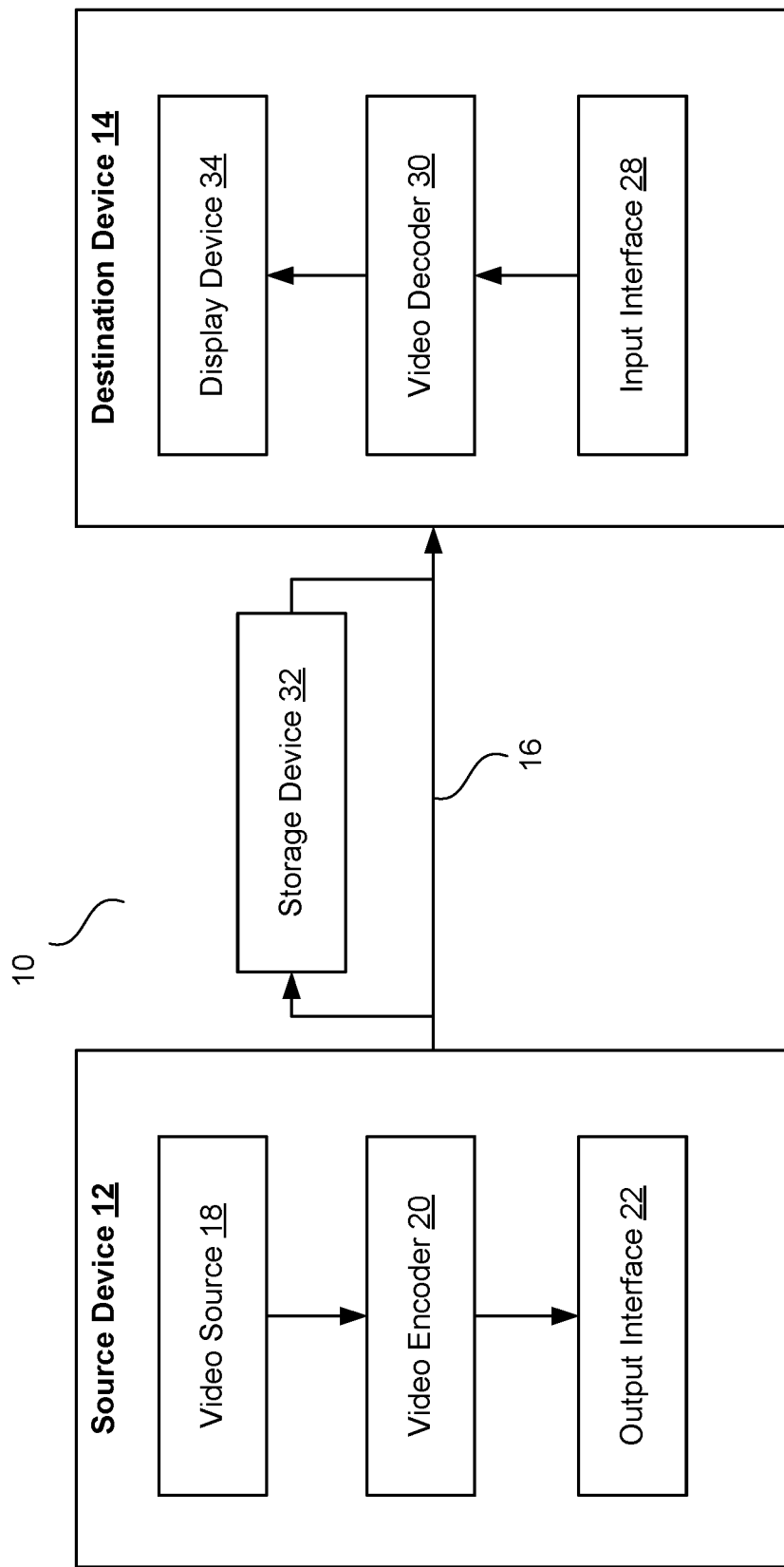
FIG. 1 is a block diagram illustrating an exemplary video encoding and decoding system, in accordance with some implementations of the present disclosure.

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

The first version of the HEVC standard was finalized in October 2013, which offers approximately 50% bit-rate saving or equivalent perceptual quality compared to the prior generation video coding standard H.264/MPEG AVC. Although the HEVC standard provides significant coding improvements than its predecessor, there is evidence that superior coding efficiency can be achieved with additional coding tools over HEVC. Based on that, both VCEG and MPEG started the exploration work of new coding technologies for future video coding standardization. Joint Video Exploration Team (JVET) was formed in October 2015 by ITU-T VECG and ISO/IEC MPEG to begin significant study of advanced technologies that could enable substantial enhancement of coding efficiency. One reference software called joint exploration model (JEM) was maintained by the JVET by integrating several additional coding tools on top of the HEVC test model (HM).

In October 2017, the joint call for proposals (CfP) on video compression with capability beyond HEVC was issued by ITU-T and ISO/IEC. In April 2018, 23 CfP responses were received and evaluated at the 10-th JVET meeting, which demonstrated compression efficiency gain over the HEVC around 40%. Based on such evaluation results, the JVET launched a new project to develop the new generation video coding standard that is named as Versatile Video Coding (VVC). In the same month, one reference software codebase, called VVC test model (VTM), was established for demonstrating a reference implementation of the VVC standard. Like HEVC, the VVC is built upon the block-based hybrid video coding framework.

The first generation AVS standard includes Chinese national standard "Information Technology, Advanced Audio Video Coding, Part 2: Video" (known as AVS1) and "Information Technology, Advanced Audio Video Coding Part 16: Radio Television Video" (known as AVS+). It can offer around 50% bit-rate saving at the same perceptual quality compared to MPEG-2 standard. The second generation AVS standard includes the series of Chinese national standard "Information Technology, Efficient Multimedia Coding" (knows as AVS2), which is mainly targeted at the transmission of extra HD TV programs. The coding efficiency of the AVS2 is double of that of the AVS+. Meanwhile, the AVS2 standard video part was submitted by Institute of Electrical and Electronics Engineers (IEEE) as one international standard for applications. The AVS3 standard is one new generation video coding standard for UHD video application aiming at surpassing the coding efficiency of the latest international standard HEVC, which provides approximately 30% bit-rate savings over the HEVC standard. In March 2019, at the 68-th AVS meeting, the AVS3-P2 baseline was finished, which provides approximately 30% bit-rate savings over the HEVC standard. Currently, one reference software, called high performance model (HPM), is maintained by the AVS group to demonstrate a reference implementation of the AVS3 standard. Like the HEVC, the AVS3 standard is built upon the block-based hybrid video coding framework.

FIG. 1 is a block diagram illustrating an exemplary system 10 for encoding and decoding video blocks in parallel in accordance with some implementations of the present disclosure. As shown in FIG. 1, system 10 includes a source device 12 that generates and encodes video data to be decoded at a later time by a destination device 14. Source device 12 and destination device 14 may comprise any of a wide variety of electronic devices, including desktop or laptop computers, tablet computers, smart phones, set-top boxes, digital televisions, cameras, display devices, digital media players, video gaming consoles, video streaming device, or the like. In some implementations, source device 12 and destination device 14 are equipped with wireless communication capabilities.

In some implementations, destination device 14 may receive the encoded video data to be decoded via a link 16. Link 16 may comprise any type of communication medium or device capable of moving the encoded video data from source device 12 to destination device 14. In one example, link 16 may comprise a communication medium to enable source device 12 to transmit the encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some other implementations, the encoded video data may be transmitted from output interface 22 to a storage device 32. Subsequently, the encoded video data in storage device 32 may be accessed by destination device 14 via input interface 28. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video data generated by source device 12. Destination device 14 may access the stored video data from storage device 32 via streaming or downloading. The file server may be any type of computer capable of storing encoded video data and transmitting the encoded video data to destination device 14. Exemplary file servers include a web server (e.g., for a website), an FTP server, network attached storage (NAS) devices, or a local disk drive. Destination device 14 may access the encoded video data through any standard data connection, including a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

As shown in FIG. 1, source device 12 includes a video source 18, a video encoder 20 and an output interface 22. Video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera of a security surveillance system, source device 12 and destination device 14 may form camera phones or video phones. However, the implementations described in the present application may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 32 for later access by destination device 14 or other devices, for decoding and/or playback. Output interface 22 may further include a modem and/or a transmitter.

Destination device 14 includes an input interface 28, a video decoder 30, and a display device 34. Input interface 28 may include a receiver and/or a modem and receive the encoded video data over link 16. The encoded video data communicated over link 16, or provided on storage device 32, may include a variety of syntax elements generated by video encoder 20 for use by video decoder 30 in decoding the video data. Such syntax elements may be included within the encoded video data transmitted on a communication medium, stored on a storage medium, or stored a file server.

In some implementations, destination device 14 may include a display device 34, which can be an integrated display device and an external display device that is configured to communicate with destination device 14. Display device 34 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to proprietary or industry standards, such as VVC, HEVC, MPEG-4, Part 10, Advanced Video Coding (AVC), AVS, or extensions of such standards. It should be understood that the present application is not limited to a specific video coding/decoding standard and may be applicable to other video coding/decoding standards. It is generally contemplated that video encoder 20 of source device 12 may be configured to encode video data according to any of these current or future standards. Similarly, it is also generally contemplated that video decoder 30 of destination device 14 may be configured to decode video data according to any of these current or future standards.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video coding/decoding operations disclosed in the present disclosure. Each of video encoder 20 and video decoder 30 may be included in one or more encoders or decoders, either of which may be integrated as part of a combined encoder/decoder (CODEC) in a respective device.

Figure 2:
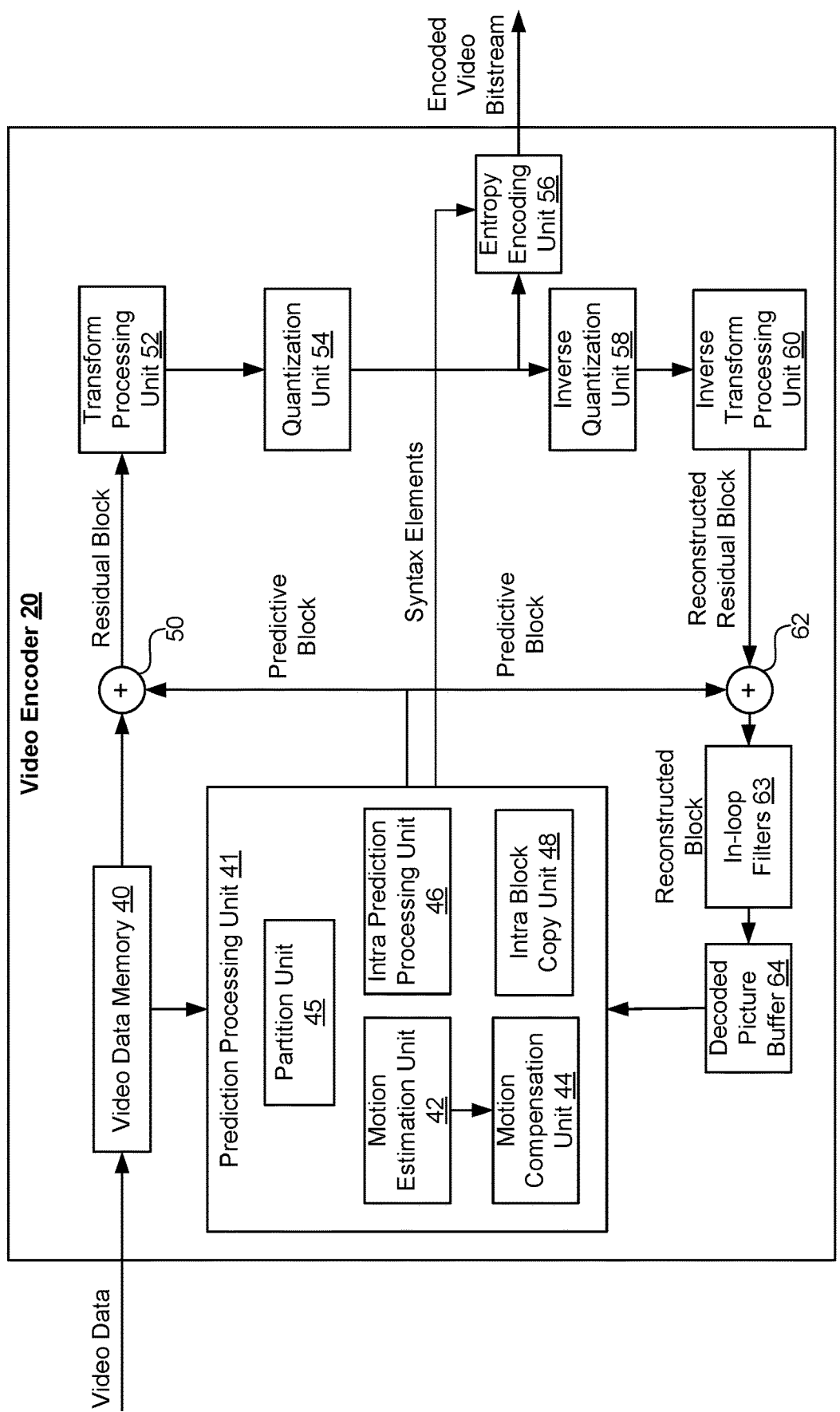
FIG. 2 is a block diagram illustrating an exemplary video encoder, in accordance with some implementations of the present disclosure.

FIG. 2 is a block diagram illustrating an exemplary video encoder 20 in accordance with some implementations described in the present application. Video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence.

As shown in FIG. 2, video encoder 20 includes video data memory 40, prediction processing unit 41, decoded picture buffer (DPB) 64, summer 50, transform processing unit 52, quantization unit 54, and entropy encoding unit 56. Prediction processing unit 41 further includes motion estimation unit 42, motion compensation unit 44, partition unit 45, intra prediction processing unit 46, and intra block copy (BC) unit 48. In some implementations, video encoder 20 also includes inverse quantization unit 58, inverse transform processing unit 60, and summer 62 for video block reconstruction. An in-loop filter 63, such as a deblocking filter may be positioned between summer 62 and DPB 64 to filter block boundaries to remove blockiness artifacts from reconstructed video. Another in-loop filter 63 may also be used in addition to the deblocking filter to filter the output of summer 62. Further in-loop filtering 63, such as sample adaptive offset (SAO) and adaptive in-loop filter (ALF) may be applied on the reconstructed CU before it is put in the reference picture store and used to code future video blocks. Video encoder 20 may take the form of a fixed or programmable hardware unit or may be divided among one or more of the illustrated fixed or programmable hardware units.

Video data memory 40 may store video data to be encoded by the components of video encoder 20. The video data in video data memory 40 may be obtained, for example, from video source 18. DPB 64 is a buffer that stores reference video data for use in encoding video data by video encoder 20 (e.g., in intra or inter predictive coding modes). Video data memory 40 and DPB 64 may be formed by any of a variety of memory devices. In various examples, video data memory 40 may be on-chip with other components of video encoder 20, or off-chip relative to those components.

As shown in FIG. 2, after receiving video data, partition unit 45 within prediction processing unit 41 partitions the video data into video blocks. This partitioning may also include partitioning a video frame into slices, tiles, or other larger coding units (CUs) according to a predefined splitting structures such as quad-tree structure associated with the video data. The video frame may be divided into multiple video blocks (or sets of video blocks referred to as tiles). Prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). Prediction processing unit 41 may provide the resulting intra or inter prediction coded block to summer 50 to generate a residual block and to summer 62 to reconstruct the encoded block for use as part of a reference frame subsequently. Prediction processing unit 41 also provides syntax elements, such as motion vectors, intra-mode indicators, partition information, and other such syntax information, to entropy encoding unit 56.

In order to select an appropriate intra predictive coding mode for the current video block, intra prediction processing unit 46 within prediction processing unit 41 may perform intra predictive coding of the current video block relative to one or more neighboring blocks in the same frame as the current block to be coded to provide spatial prediction. Motion estimation unit 42 and motion compensation unit 44 within prediction processing unit 41 perform inter predictive coding of the current video block relative to one or more predictive blocks in one or more reference frames to provide temporal prediction. Video encoder 20 may perform multiple coding passes, e.g., to select an appropriate coding mode for each block of video data.

In some implementations, motion estimation unit 42 determines the inter prediction mode for a current video frame by generating a motion vector, which indicates the displacement of a prediction unit (PU) of a video block within the current video frame relative to a predictive block within a reference video frame, according to a predetermined pattern within a sequence of video frames. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). The predetermined pattern may designate video frames in the sequence as P frames or B frames. Intra BC unit 48 may determine vectors, e.g., block vectors, for intra BC coding in a manner similar to the determination of motion vectors by motion estimation unit 42 for inter prediction, or may utilize motion estimation unit 42 to determine the block vector.

A predictive block is a block of a reference frame that is deemed as closely matching the PU of the video block to be coded in terms of pixel difference, which may be determined by sum of absolute difference (SAD), sum of square difference (SSD), or other difference metrics. In some implementations, video encoder 20 may calculate values for sub-integer pixel positions of reference frames stored in DPB 64. For example, video encoder 20 may interpolate values of one-quarter pixel positions, one-eighth pixel positions, or other fractional pixel positions of the reference frame. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter prediction coded frame by comparing the position of the PU to the position of a predictive block of a reference frame selected from a first reference frame list (List 0) or a second reference frame list (List 1), each of which identifies one or more reference frames stored in DPB 64. Motion estimation unit 42 sends the calculated motion vector to motion compensation unit 44 and then to entropy encoding unit 56.

Motion compensation, performed by motion compensation unit 44, may involve fetching or generating the predictive block based on the motion vector determined by motion estimation unit 42. Upon receiving the motion vector for the PU of the current video block, motion compensation unit 44 may locate a predictive block to which the motion vector points in one of the reference frame lists, retrieve the predictive block from DPB 64, and forward the predictive block to summer 50. Summer 50 then forms a residual video block of pixel difference values by subtracting pixel values of the predictive block provided by motion compensation unit 44 from the pixel values of the current video block being coded. The pixel difference values forming the residual vide block may include luma or chroma difference components or both. Motion compensation unit 44 may also generate syntax elements associated with the video blocks of a video frame for use by video decoder 30 in decoding the video blocks of the video frame. The syntax elements may include, for example, syntax elements defining the motion vector used to identify the predictive block, any flags indicating the prediction mode, or any other syntax information described herein. Note that motion estimation unit 42 and motion compensation unit 44 may be highly integrated, but are illustrated separately for conceptual purposes.

In some implementations, intra BC unit 48 may generate vectors and fetch predictive blocks in a manner similar to that described above in connection with motion estimation unit 42 and motion compensation unit 44, but with the predictive blocks being in the same frame as the current block being coded and with the vectors being referred to as block vectors as opposed to motion vectors. In particular, intra BC unit 48 may determine an intra-prediction mode to use to encode a current block. In some examples, intra BC unit 48 may encode a current block using various intra-prediction modes, e.g., during separate encoding passes, and test their performance through rate-distortion analysis. Next, intra BC unit 48 may select, among the various tested intra-prediction modes, an appropriate intra-prediction mode to use and generate an intra-mode indicator accordingly. For example, intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In other examples, intra BC unit 48 may use motion estimation unit 42 and motion compensation unit 44, in whole or in part, to perform such functions for Intra BC prediction according to the implementations described herein. In either case, for Intra block copy, a predictive block may be a block that is deemed as closely matching the block to be coded, in terms of pixel difference, which may be determined by sum of absolute difference (SAD), sum of squared difference (SSD), or other difference metrics, and identification of the predictive block may include calculation of values for sub-integer pixel positions.

Whether the predictive block is from the same frame according to intra prediction, or a different frame according to inter prediction, video encoder 20 may form a residual video block by subtracting pixel values of the predictive block from the pixel values of the current video block being coded, forming pixel difference values. The pixel difference values forming the residual video block may include both luma and chroma component differences.

Intra prediction processing unit 46 may intra-predict a current video block, as an alternative to the inter-prediction performed by motion estimation unit 42 and motion compensation unit 44, or the intra block copy prediction performed by intra BC unit 48, as described above. In particular, intra prediction processing unit 46 may determine an intra prediction mode to use to encode a current block. To do so, intra prediction processing unit 46 may encode a current block using various intra prediction modes, e.g., during separate encoding passes, and intra prediction processing unit 46 (or a mode select unit, in some examples) may select an appropriate intra prediction mode to use from the tested intra prediction modes. Intra prediction processing unit 46 may provide information indicative of the selected intra-prediction mode for the block to entropy encoding unit 56. Entropy encoding unit 56 may encode the information indicating the selected intra-prediction mode in the bitstream.

After prediction processing unit 41 determines the predictive block for the current video block via either inter prediction or intra prediction, summer 50 forms a residual video block by subtracting the predictive block from the current video block. The residual video data in the residual block may be included in one or more transform units (TUs) and is provided to transform processing unit 52. Transform processing unit 52 transforms the residual video data into residual transform coefficients using a transform, such as a discrete cosine transform (DCT) or a conceptually similar transform.

Transform processing unit 52 may send the resulting transform coefficients to quantization unit 54. Quantization unit 54 quantizes the transform coefficients to further reduce bit rate. The quantization process may also reduce the bit depth associated with some or all of the coefficients. The degree of quantization may be modified by adjusting a quantization parameter. In some examples, quantization unit 54 may then perform a scan of a matrix including the quantized transform coefficients. Alternatively, entropy encoding unit 56 may perform the scan.

Following quantization, entropy encoding unit 56 entropy encodes the quantized transform coefficients into a video bitstream using, e.g., context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. The encoded bitstream may then be transmitted to video decoder 30, or archived in storage device 32 for later transmission to or retrieval by video decoder 30. Entropy encoding unit 56 may also entropy encode the motion vectors and the other syntax elements for the current video frame being coded.

Inverse quantization unit 58 and inverse transform processing unit 60 apply inverse quantization and inverse transformation, respectively, to reconstruct the residual video block in the pixel domain for generating a reference block for prediction of other video blocks. As noted above, motion compensation unit 44 may generate a motion compensated predictive block from one or more reference blocks of the frames stored in DPB 64. Motion compensation unit 44 may also apply one or more interpolation filters to the predictive block to calculate sub-integer pixel values for use in motion estimation.

Summer 62 adds the reconstructed residual block to the motion compensated predictive block produced by motion compensation unit 44 to produce a reference block for storage in DPB 64. The reference block may then be used by intra BC unit 48, motion estimation unit 42 and motion compensation unit 44 as a predictive block to inter predict another video block in a subsequent video frame.

Figure 3:
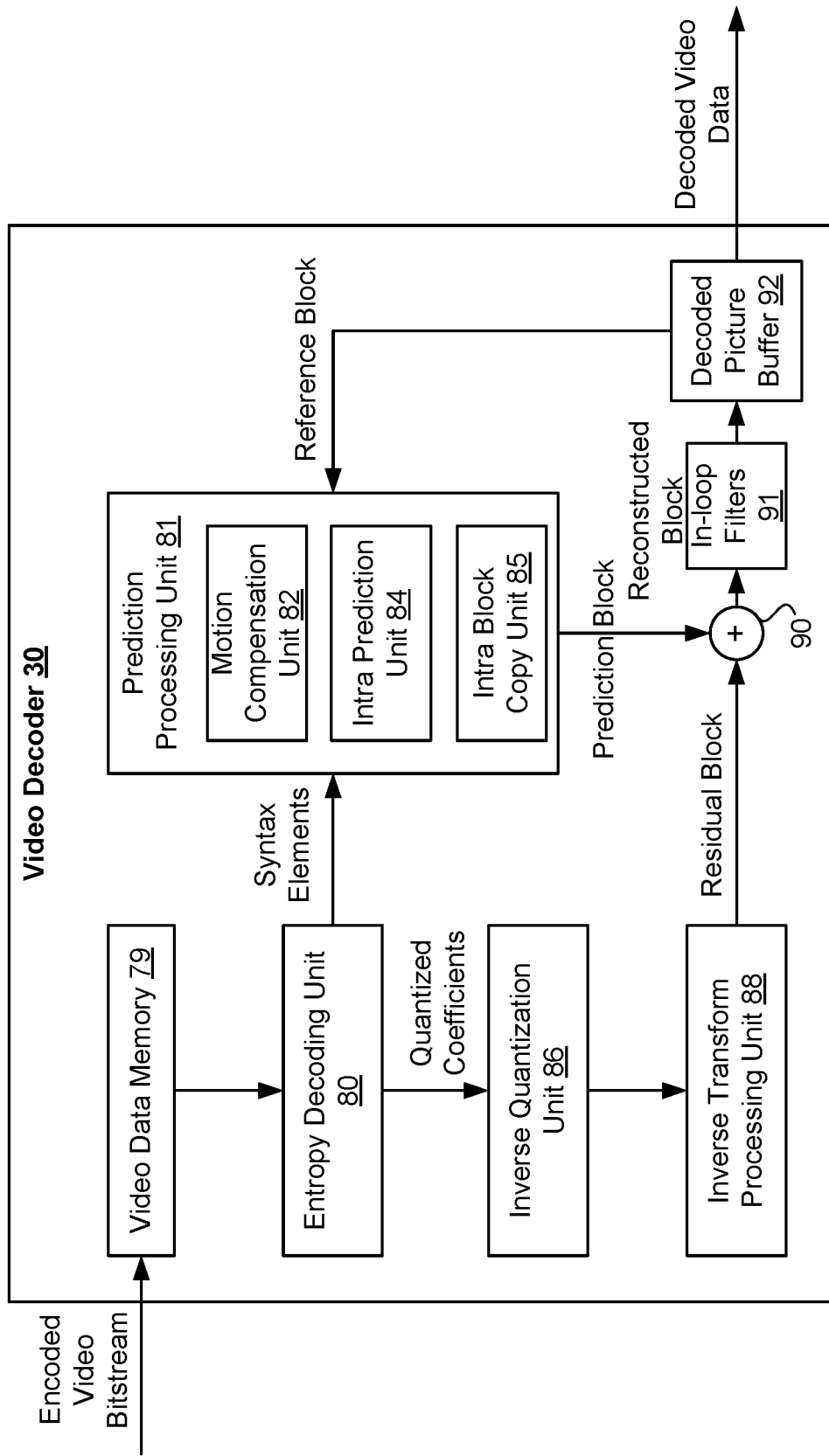
FIG. 3 is a block diagram illustrating an exemplary video decoder, in accordance with some implementations of the present disclosure.

FIG. 3 is a block diagram illustrating an exemplary video decoder 30 in accordance with some implementations of the present application. Video decoder 30 includes video data memory 79, entropy decoding unit 80, prediction processing unit 81, inverse quantization unit 86, inverse transform processing unit 88, summer 90, and DPB 92. Prediction processing unit 81 further includes motion compensation unit 82, intra prediction processing unit 84, and intra BC unit 85. Video decoder 30 may perform a decoding process generally reciprocal to the encoding process described above with respect to video encoder 20 in connection with FIG. 2. For example, motion compensation unit 82 may generate prediction data based on motion vectors received from entropy decoding unit 80, while intra-prediction unit 84 may generate prediction data based on intra-prediction mode indicators received from entropy decoding unit 80.

In some examples, a unit of video decoder 30 may be tasked to perform the implementations of the present application. Also, in some examples, the implementations of the present disclosure may be divided among one or more of the units of video decoder 30. For example, intra BC unit 85 may perform the implementations of the present application, alone, or in combination with other units of video decoder 30, such as motion compensation unit 82, intra prediction processing unit 84, and entropy decoding unit 80. In some examples, video decoder 30 may not include intra BC unit 85 and the functionality of intra BC unit 85 may be performed by other components of prediction processing unit 81, such as motion compensation unit 82.

Video data memory 79 may store video data, such as an encoded video bitstream, to be decoded by the other components of video decoder 30. The video data stored in video data memory 79 may be obtained, for example, from storage device 32, from a local video source, such as a camera, via wired or wireless network communication of video data, or by accessing physical data storage media (e.g., a flash drive or hard disk). Video data memory 79 may include a coded picture buffer (CPB) that stores encoded video data from an encoded video bitstream. Decoded picture buffer (DPB) 92 of video decoder 30 stores reference video data for use in decoding video data by video decoder 30 (e.g., in intra or inter predictive coding modes). Video data memory 79 and DPB 92 may be formed by any of a variety of memory devices, such as dynamic random access memory (DRAM), including synchronous DRAM (SDRAM), magneto-resistive RAM (MRAM), resistive RAM (RRAM), or other types of memory devices. For illustrative purpose, video data memory 79 and DPB 92 are depicted as two distinct components of video decoder 30 in FIG. 3. But it will be apparent to one skilled in the art that video data memory 79 and DPB 92 may be provided by the same memory device or separate memory devices. In some examples, video data memory 79 may be on-chip with other components of video decoder 30, or off-chip relative to those components.

During the decoding process, video decoder 30 receives an encoded video bitstream that represents video blocks of an encoded video frame and associated syntax elements. Video decoder 30 may receive the syntax elements at the video frame level and/or the video block level. Entropy decoding unit 80 of video decoder 30 entropy decodes the bitstream to generate quantized coefficients, motion vectors or intra-prediction mode indicators, and other syntax elements. Entropy decoding unit 80 then forwards the motion vectors and other syntax elements to prediction processing unit 81.

When the video frame is coded as an intra predictive coded (I) frame or for intra coded predictive blocks in other types of frames, intra prediction processing unit 84 of prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, motion compensation unit 82 of prediction processing unit 81 produces one or more predictive blocks for a video block of the current video frame based on the motion vectors and other syntax elements received from entropy decoding unit 80. Each of the predictive blocks may be produced from a reference frame within one of the reference frame lists. Video decoder 30 may construct the reference frame lists, List 0 and List 1, using default construction techniques based on reference frames stored in DPB 92.

In some examples, when the video block is coded according to the intra BC mode described herein, intra BC unit 85 of prediction processing unit 81 produces predictive blocks for the current video block based on block vectors and other syntax elements received from entropy decoding unit 80. The predictive blocks may be within a reconstructed region of the same picture as the current video block defined by video encoder 20.

Motion compensation unit 82 and/or intra BC unit 85 determines prediction information for a video block of the current video frame by parsing the motion vectors and other syntax elements, and then uses the prediction information to produce the predictive blocks for the current video block being decoded. For example, motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, intra BC unit 85 may use some of the received syntax elements, e.g., a flag, to determine that the current video block was predicted using the intra BC mode, construction information of which video blocks of the frame are within the reconstructed region and should be stored in DPB 92, block vectors for each intra BC predicted video block of the frame, intra BC prediction status for each intra BC predicted video block of the frame, and other information to decode the video blocks in the current video frame.

Motion compensation unit 82 may also perform interpolation using the interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes the quantized transform coefficients provided in the bitstream and entropy decoded by entropy decoding unit 80 using the same quantization parameter calculated by video encoder 20 for each video block in the video frame to determine a degree of quantization. Inverse transform processing unit 88 applies an inverse transform, e.g., an inverse DCT, an inverse integer transform, or a conceptually similar inverse transform process, to the transform coefficients in order to reconstruct the residual blocks in the pixel domain.

After motion compensation unit 82 or intra BC unit 85 generates the predictive block for the current video block based on the vectors and other syntax elements, summer 90 reconstructs decoded video block for the current video block by summing the residual block from inverse transform processing unit 88 and a corresponding predictive block generated by motion compensation unit 82 and intra BC unit 85. An in-loop filter 91 may be positioned between summer 90 and DPB 92 to further process the decoded video block. The in-loop filtering 91, such as deblocking filter, sample adaptive offset (SAO) and adaptive in-loop filter (ALF) may be applied on the reconstructed CU before it is put in the reference picture store. The decoded video blocks in a given frame are then stored in DPB 92, which stores reference frames used for subsequent motion compensation of next video blocks. DPB 92, or a memory device separate from DPB 92, may also store decoded video for later presentation on a display device, such as display device 34 of FIG. 1.

In a typical video coding process, a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

Like the HEVC, the VVC/AVS3 standard is built upon the block-based hybrid video coding framework. The input video signal is processed block by block (called coding units (CUs)). In VVC Test model (VTM)-1.0, a CU can be up to 128×128 pixels. Different from the HEVC which partitions blocks only based on quad-trees, in the VCC/AVS3, one coding tree unit (CTU) is split into CUs to adapt to varying local characteristics based on quad/binary/ternary-tree (VCC) or extended-quad-tree (AVS3). Additionally, the concept of multiple partition unit type in the HEVC is removed, i.e., the separation of CU, prediction unit (PU) and transform unit (TU) does not exist in the VCC/AVS3 anymore. Instead, each CU is always used as the basic unit for both prediction and transform without further partitions. In the tree partition structure of the VCC/AVS3, one CTU is firstly partitioned based on a quad-tree structure. Then, each quad-tree leaf node can be further partitioned based on a binary and ternary-tree (VCC) or extended-quad-tree (AVS3) structure.

Figure 4A:
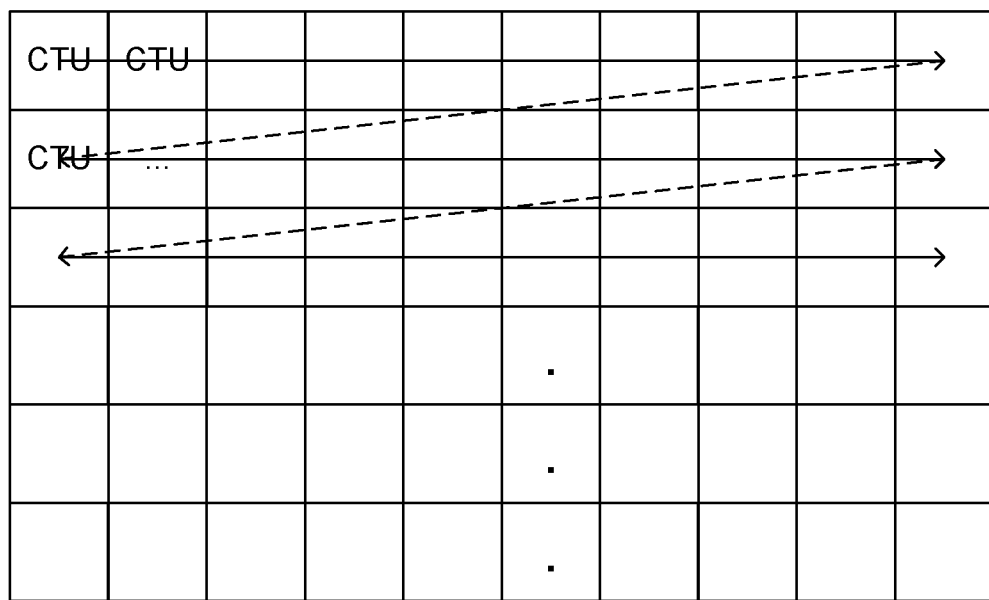
FIGS. 4A through 4E are block diagrams illustrating how a frame is recursively partitioned into multiple video blocks of different sizes and shapes, in accordance with some implementations of the present disclosure.
Figure 4B:
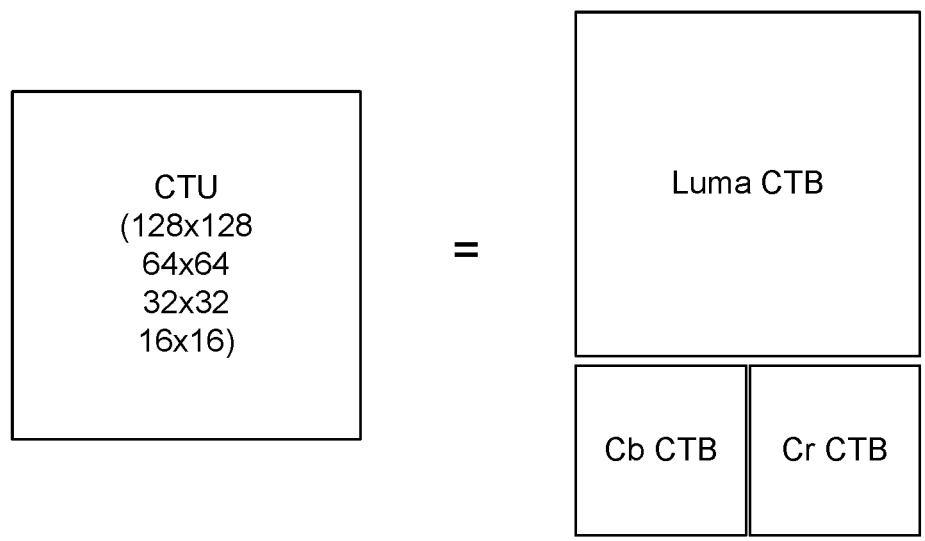

As shown in FIG. 4A, video encoder 20 (or more specifically partition unit 45) generates an encoded representation of a frame by first partitioning the frame into a set of coding tree units (CTUs). A video frame may include an integer number of CTUs ordered consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that the present application is not necessarily limited to a particular size. As shown in FIG. 4B, each CTU may comprise one coding tree block (CTB) of luma samples, two corresponding coding tree blocks of chroma samples, and syntax elements used to code the samples of the coding tree blocks. The syntax elements describe properties of different types of units of a coded block of pixels and how the video sequence can be reconstructed at the video decoder 30, including inter or intra prediction, intra prediction mode, motion vectors, and other parameters. In monochrome pictures or pictures having three separate color planes, a CTU may comprise a single coding tree block and syntax elements used to code the samples of the coding tree block. A coding tree block may be an N×N block of samples.

Figure 4C:
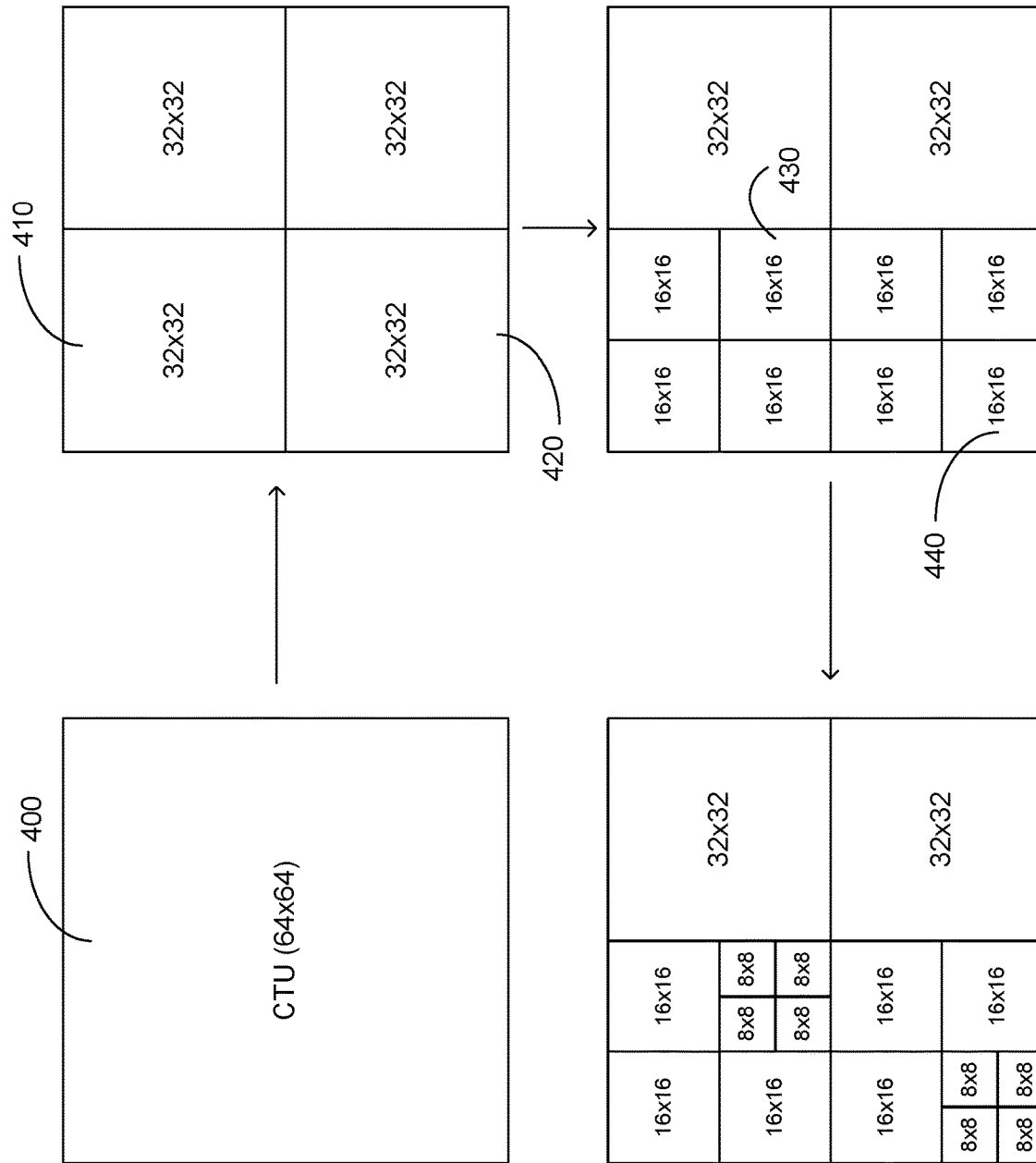
Figure 4D:
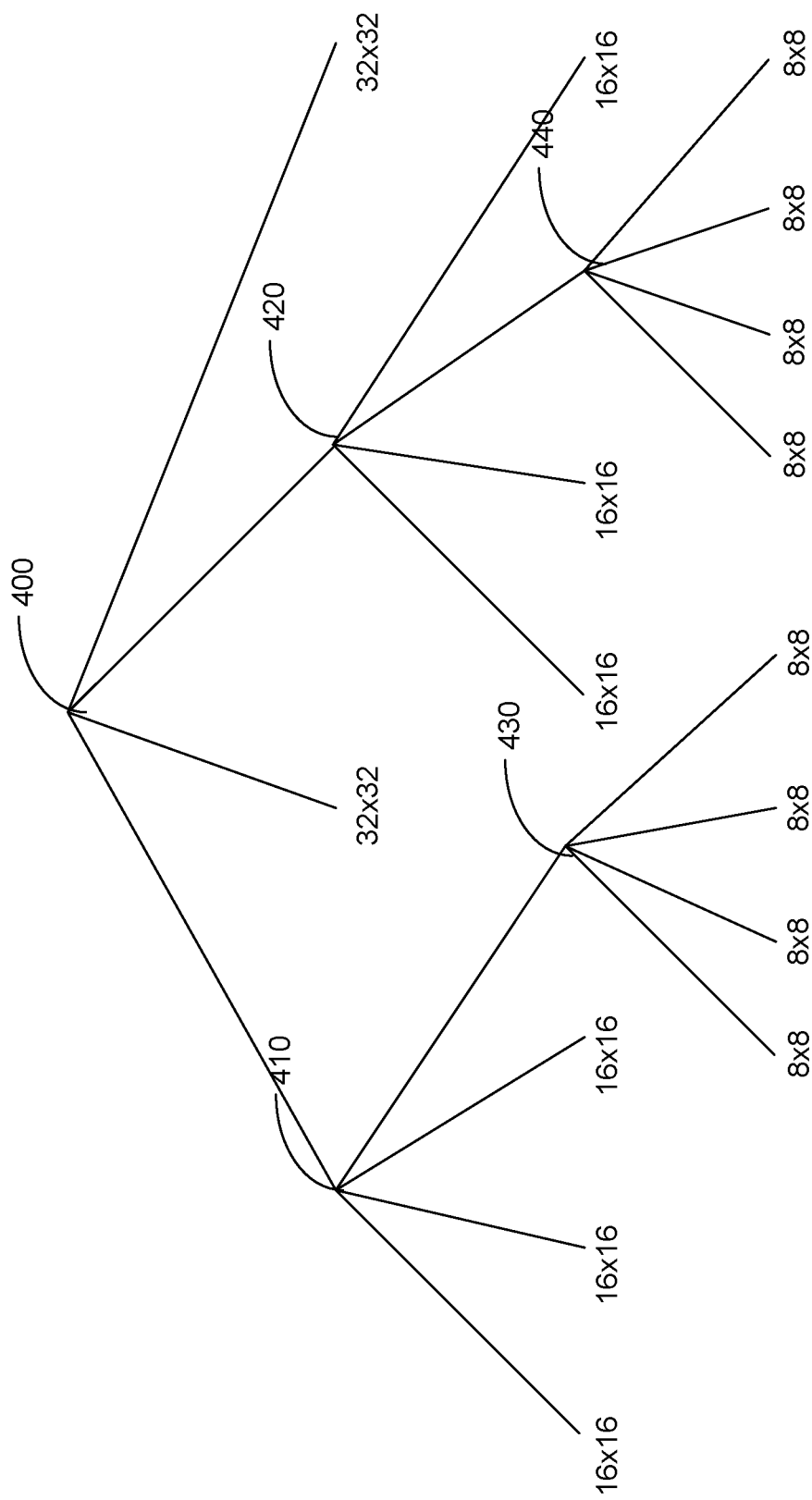
Figure 4E:
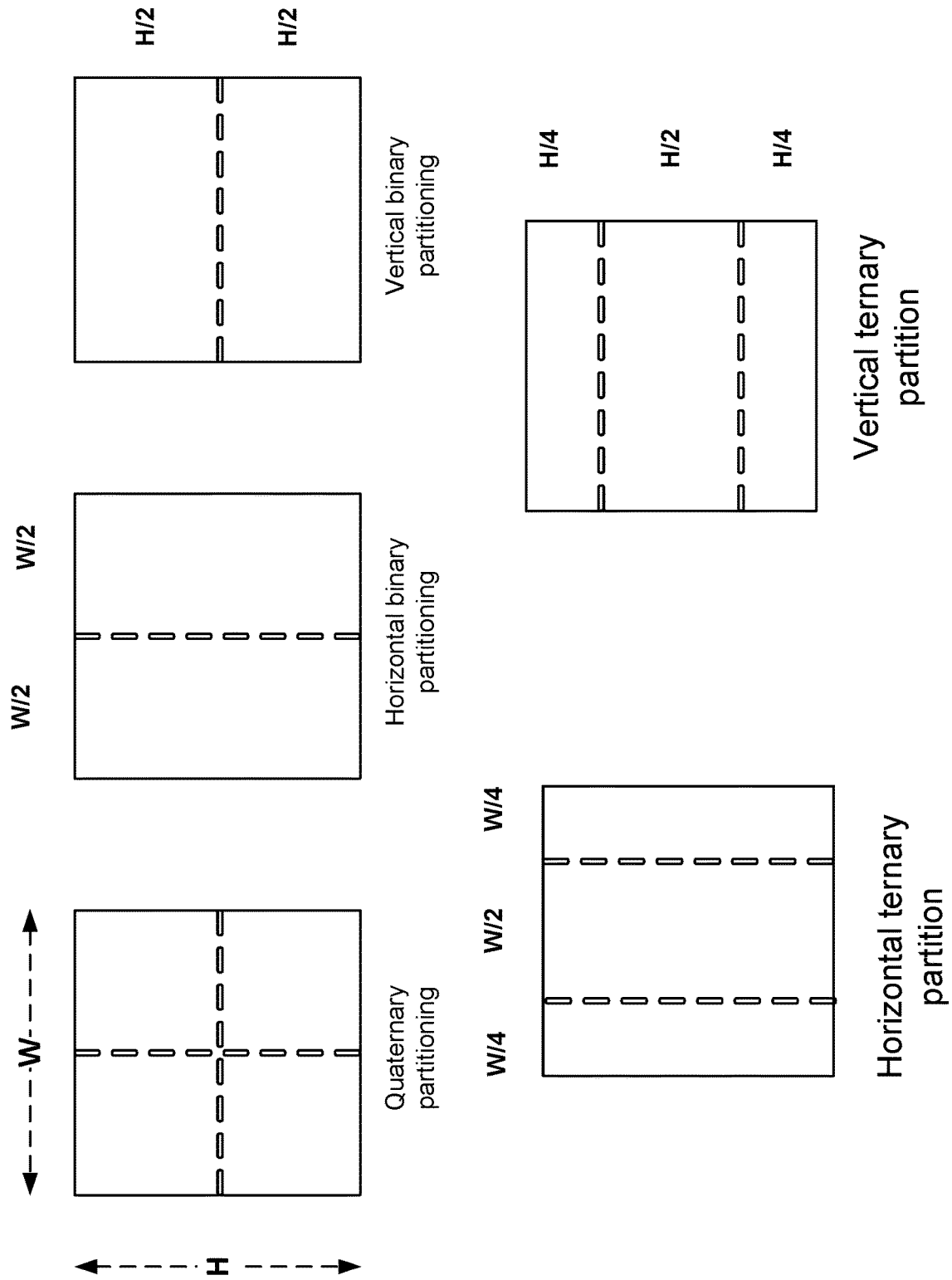

To achieve a better performance, video encoder 20 may recursively perform tree partitioning such as binary-tree partitioning, ternary-tree partitioning, quad-tree partitioning or a combination of both on the coding tree blocks of the CTU and divide the CTU into smaller coding units (CUs). As depicted in FIG. 4C, the 64×64 CTU 400 is first divided into four smaller CU, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 4D depicts a quad-tree data structure illustrating the end result of the partition process of the CTU 400 as depicted in FIG. 4C, each leaf node of the quad-tree corresponding to one CU of a respective size ranging from 32×32 to 8×8. Like the CTU depicted in FIG. 4B, each CU may comprise a coding block (CB) of luma samples and two corresponding coding blocks of chroma samples of a frame of the same size, and syntax elements used to code the samples of the coding blocks. In monochrome pictures or pictures having three separate color planes, a CU may comprise a single coding block and syntax structures used to code the samples of the coding block. It should be noted that the quad-tree partitioning depicted in FIGS. 4C and 4D is only for illustrative purposes and one CTU can be split into CUs to adapt to varying local characteristics based on quad/ternary/binary-tree partitions. In the multi-type tree structure, one CTU is partitioned by a quad-tree structure and each quad-tree leaf CU can be further partitioned by a binary and ternary tree structure. As shown in FIG. 4E, there are five splitting/partitioning types in the VCC, i.e., quaternary partitioning, horizontal binary partitioning, vertical binary partitioning, horizontal ternary partitioning, and vertical ternary partitioning.

In some implementations, video encoder 20 may further partition a coding block of a CU into one or more M×N prediction blocks (PB). A prediction block is a rectangular (square or non-square) block of samples on which the same prediction, inter or intra, is applied. A prediction unit (PU) of a CU may comprise a prediction block of luma samples, two corresponding prediction blocks of chroma samples, and syntax elements used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the frame associated with the PU. If video encoder 20 uses inter prediction to generate the predictive blocks of a PU, video encoder 20 may generate the predictive blocks of the PU based on decoded samples of one or more frames other than the frame associated with the PU.

After video encoder 20 generates predictive luma, Cb, and Cr blocks for one or more PUs of a CU, video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block and each sample in the CU's Cr residual block may indicate a difference between a Cr sample in one of the CU's predictive Cr blocks and a corresponding sample in the CU's original Cr coding block.

Furthermore, as illustrated in FIG. 4C, video encoder 20 may use quad-tree partitioning to decompose the luma, Cb, and Cr residual blocks of a CU into one or more luma, Cb, and Cr transform blocks. A transform block is a rectangular (square or non-square) block of samples on which the same transform is applied. A transform unit (TU) of a CU may comprise a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Finally, video encoder 20 may output a bitstream that includes a sequence of bits that forms a representation of coded frames and associated data, which is either saved in storage device 32 or transmitted to destination device 14.

After receiving a bitstream generated by video encoder 20, video decoder 30 may parse the bitstream to obtain syntax elements from the bitstream. Video decoder 30 may reconstruct the frames of the video data based at least in part on the syntax elements obtained from the bitstream. The process of reconstructing the video data is generally reciprocal to the encoding process performed by video encoder 20. For example, video decoder 30 may perform inverse transforms on the coefficient blocks associated with TUs of a current CU to reconstruct residual blocks associated with the TUs of the current CU. Video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

In general, the basic intra prediction scheme applied in the VVC is kept the same as that of the HEVC, except that several modules are further extended and/or improved, e.g., deblocking filter, sample adaptive offset (SAO) and adaptive in-loop filter (ALF). The main focus of the systems and methods disclosed herein is to improve the in-loop design in the VVC standard.

Figure 5:
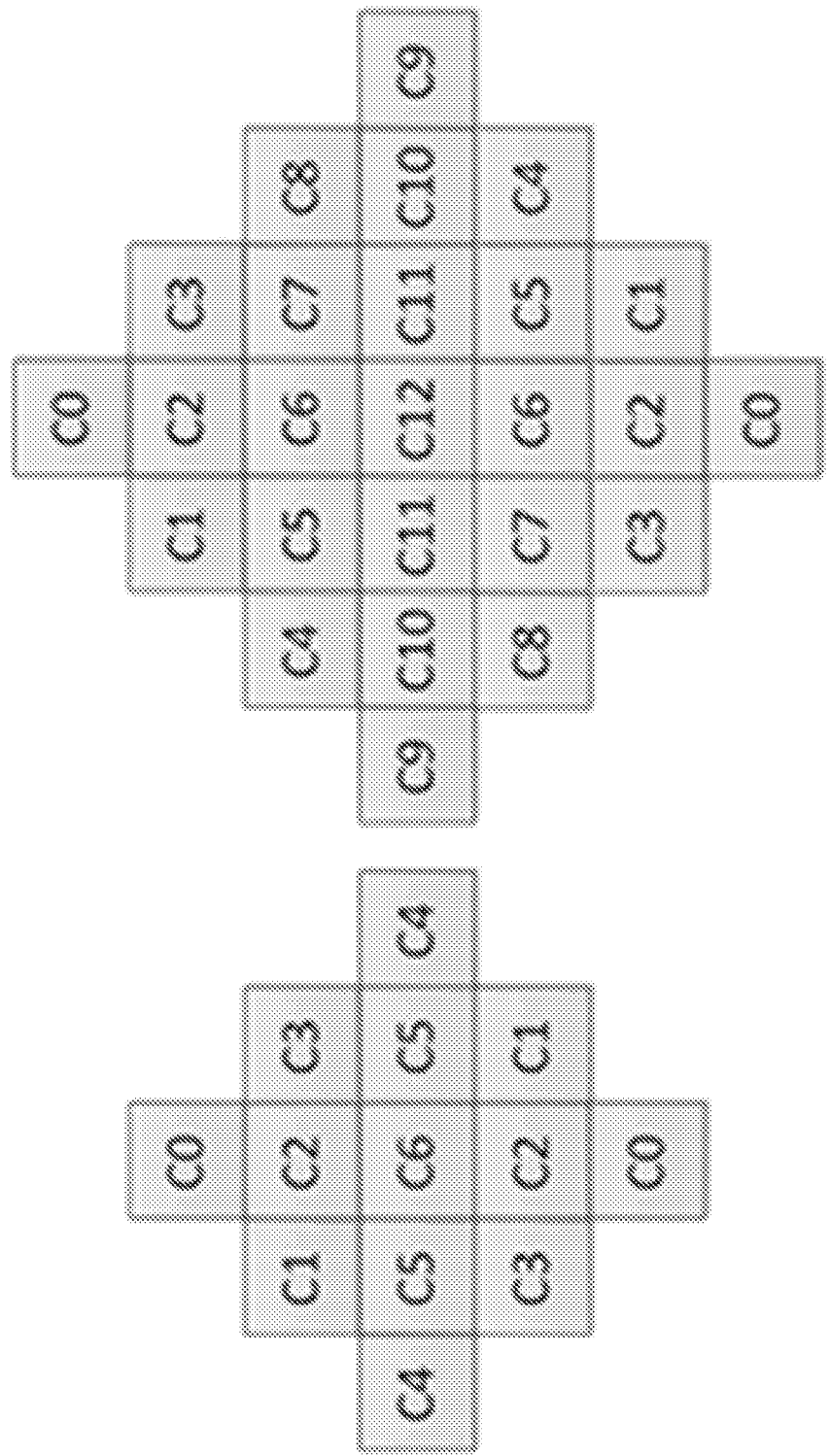
FIG. 5 is a block diagram illustrating Adaptive Loop Filter (ALF) filter shapes, in accordance with some implementations of the present disclosure.

In current VTM, an Adaptive Loop Filter (ALF) with block-based filter adaption is applied. For the luma component, one among 25 filters is selected for each 4×4 block, based on the direction and activity of local gradients. FIG. 5 is a block diagram illustrating ALF filter shapes, in accordance with some implementations of the present disclosure. Two diamond filter shapes are used as shown in FIG. 5. The 7×7 diamond shape on the right of FIG. 5 is applied for luma component and the 5×5 diamond shape on the left of FIG. 5 is applied for chroma components.

In some embodiments, block classification of ALF is further described below. For luma component, each 4×4 block is categorized into one out of 25 classes. The classification index C is derived based on its directionality D and a quantized value of activity A^, as follows:

$$C=5D+A\hat{\ } \quad (1\text{-}1)$$

To calculate D and A^, gradients of the horizontal, vertical and two diagonal directions are first calculated using 1-D Laplacian:

$$\text{sum}_v=\Sigma_{k=i-2}^{i+3}\Sigma_{l=j-2}^{j+3}V_{k,l},\ V_{k,l}=|2R(k,l)-R(k,l-1)-R(k,l+1)| \quad (1\text{-}2)$$

$$\text{sum}_h=\Sigma_{k=i-2}^{i+3}\Sigma_{l=j-2}^{j+3}H_{k,l},\ H_{k,l}=|2R(k,l)-R(k,l-1)-R(k,1+l,l)| \quad (1\text{-}3)$$

$$\text{sum}_{d0}=\Sigma_{k=i-2}^{i+3}\Sigma_{l=j-1}^{j+3}D0_{k,l},\ D0_{k,l}=|2R(k,l)-R(k,l-1,l-1)-R(k+1,l+1)| \quad (1\text{-}4)$$

$$\text{sum}_{d1}=\Sigma_{k=i-2}^{i+3}\Sigma_{j=j-2}^{j+3}D1_{k,l},\ D1_{k,l}=|2R(k,l)-R(k-1,l-1)-R(k+1,l+1)| \quad (1\text{-}5)$$

Where indices i and j refer to the coordinates of the upper left sample within the 4×4 block and R(i, j) indicates a reconstructed sample at coordinate (i,j).

Figure 6A:
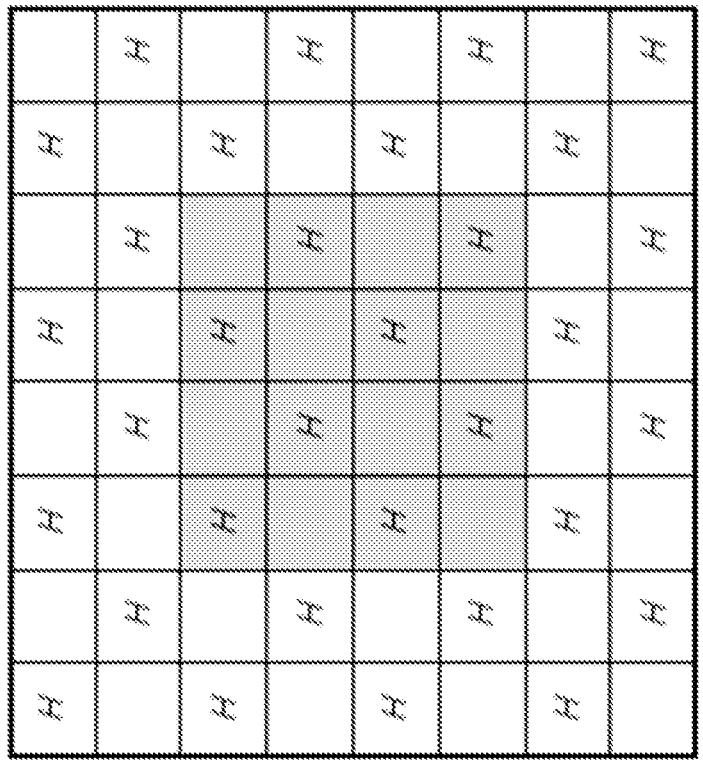
Figure 6A:
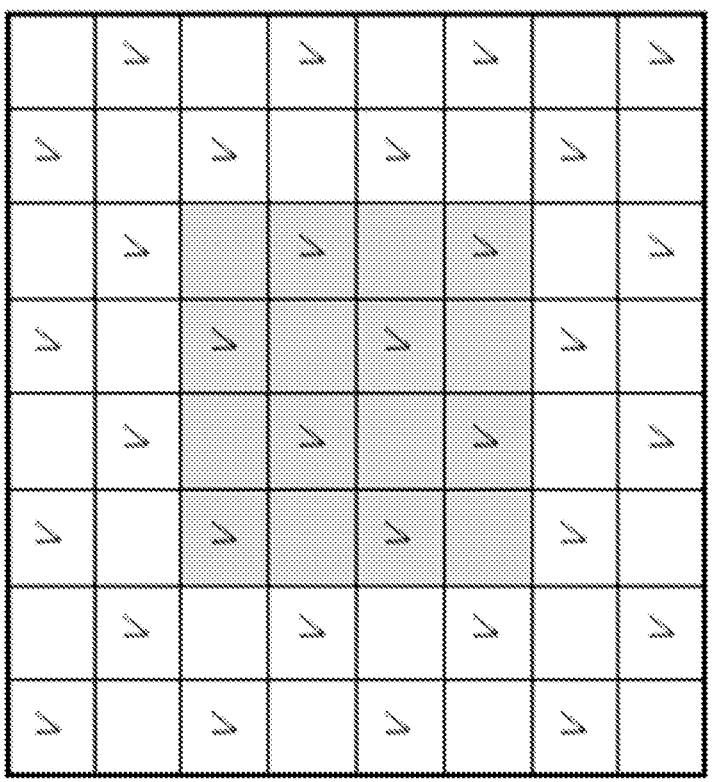
Figure 6B:
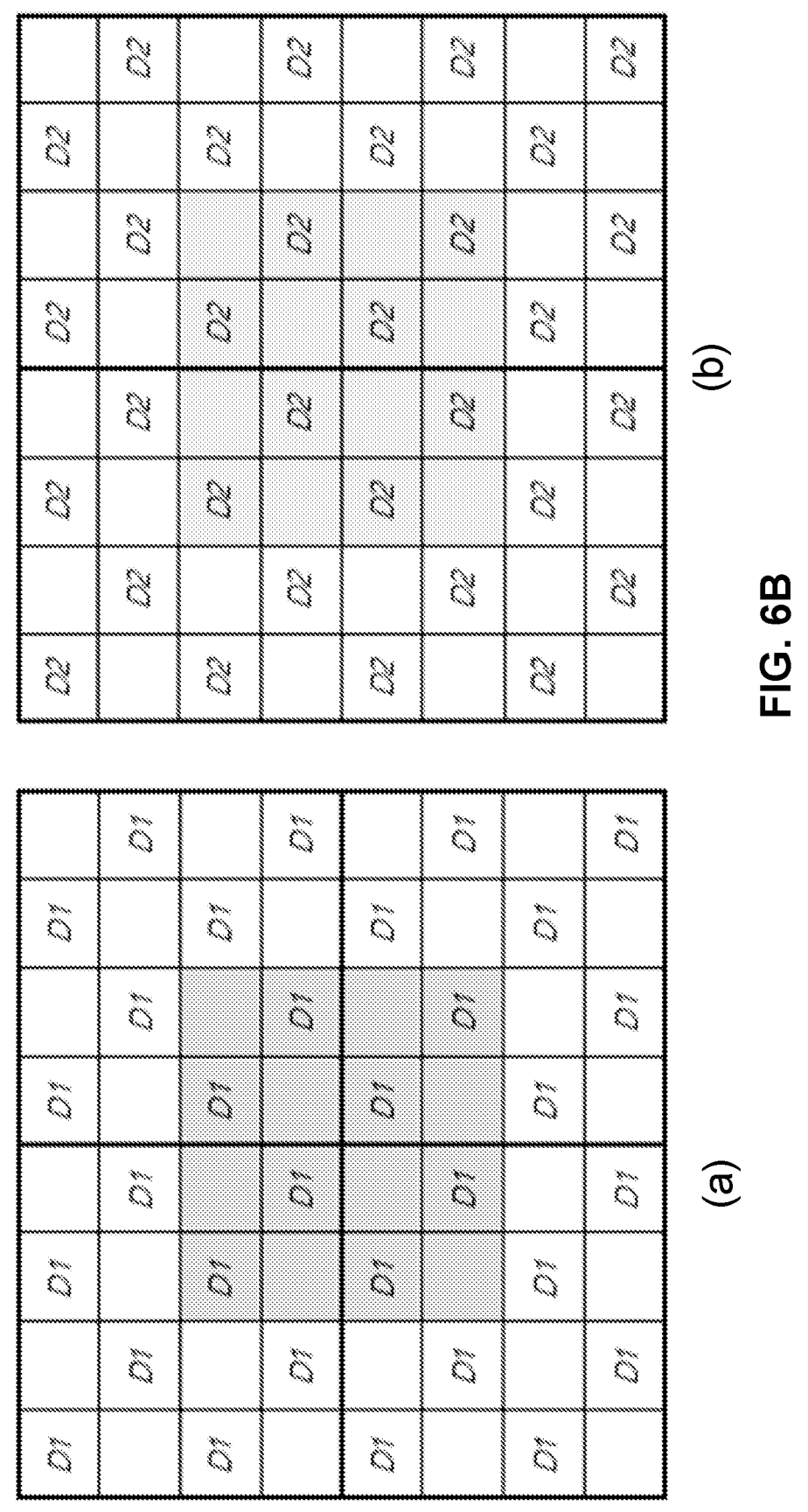

To reduce the complexity of block classification, the subsampled 1-D Laplacian calculation is applied. FIGS. 6A and 6B are block diagrams depicting subsampled positions used for gradient calculation of different directions, in accordance with some implementations of the present disclosure. As shown in FIGS. 6A and 6B, the same subsampled positions are used for gradient calculation of all directions. FIG. 6A (a) shows subsampled positions for vertical gradient. FIG. 6A (b) shows subsampled positions for horizontal gradient. FIG. 6B (a) shows subsampled positions for diagonal gradient. FIG. 6B (b) shows subsampled positions for diagonal gradient.

Then D is derived by $D_{NAIn}$ and $D_{ctrength}$ as following, $$D=((D\text{main}\&\ 0x1)|\ 1)+D\text{strength} \quad (1\text{-}6)$$

The $D_{NAIn}$ and $D_{ctrength}$ is derived by $HV_0$, $HV_1$, $Dir_0 Dir_1$, $HVD_0$, $HVD_1$, $DteNp_{KV}$, $DteNp_{D01}$ as following, $$HV_0=(\text{sum}_v>\text{sum}_h)?\text{sum}_v:\text{sum}_h \quad (1\text{-}7)$$

$$HV_1=(\text{sum}_v>\text{sum}_h)?\text{sum}_h:\text{sum}_v \quad (1\text{-}8)$$

$$D\text{temp}_{HV}=(\text{sum}_v>\text{sum}_h)?1:3 \quad (1\text{-}9)$$

$$Dir_0=(\text{sum}_{d0}>\text{sum}_{d1})?\text{sum}_{d0}:\text{sum}_{d1} \quad (1\text{-}10)$$

$$Dir_1=(\text{sum}_{d0}>\text{sum}_{d1})?\text{sum}_{d1}:\text{sum}_{d0} \quad (1\text{-}11)$$

$$D\text{temp}_{D01}=(\text{sum}_{d0}>\text{sum}_{d1})?0:2 \quad (1\text{-}12)$$

$$D_{main}=(Dir_1*HV_0>Dir_0*HV_1)?D\text{temp}_{D01}:D\text{temp}_{HV} \quad (1\text{-}13)$$

$$D_{strength}=(HVD_1>2*HVD_0)?1:(HVD_1*2>9*HVD_0)?2:0 \quad (1\text{-}14)$$

The activity value A is calculated as:

$$A=\text{sum}_v+\text{sum}_h \quad (1\text{-}15)$$

A is further quantized to the range of 0 to 4, inclusively, and the quantized value is denoted as A^.

For chroma components in a picture, no classification method is applied, i.e. a single set of ALF coefficients is applied for each chroma component.

In some embodiments, geometric transformations of filter coefficients and clipping values of ALF are further described below. Before filtering each 4×4 luma block, geometric transformations such as rotation or diagonal and vertical flipping are applied to the filter coefficients f(j) and to the corresponding filter clipping values c(j) depending on gradient values calculated for that block. This is equivalent to applying these transformations to the samples in the filter support region. The idea is to make different blocks to which ALF is applied more similarly by aligning their directionality.

The filter coefficients and the coefficients $f_L(j)$ filter clipping values $c_L(j)$, j=0 . . . 11, are for luma and derived by filtIdx$_L$ [x][y] and AlfCoeff$_L$[i], which are coefficients sets that are signaled from encoder.

$$f_L(j)=\text{AlfCoeff}_L[i][\text{filtIdx}[x][y]][j] \quad (1\text{-}16)$$

$$c_L(j)=\text{AlfClip}_L[i][\text{filtIdx}[x][y]][j] \quad (1\text{-}17)$$

$$\text{transposeTable}[\ ]=\{0,1,0,2,2,3,1,3\} \quad (1\text{-}18)$$

$$\text{transposeIdx}[x][y]=\text{transposeTable}[\text{dir}1[x][y]*2+(\text{dir}2[x][y]>>1)] \quad (1\text{-}19)$$

$$\text{varTab}[\ ]=\{0,1,2,2,2,2,2,3,3,3,3,3,3,3,4\} \quad (1\text{-}20)$$

$$\text{avgVar}[x][y]=\text{varTab}[\text{Clip}3(0,15,(\hat{A}[x>>2][y>>2]*ac[x>>2][y>>2])>>(3+\text{BitDepth}))]) \quad (1\text{-}21)$$

$$\text{filtIdx}_L[x][y] = \begin{cases} \text{avg Var }[x][y], \text{ if } D_{strength} \text{ is not equal to 0} \\ += D^*5 \end{cases} \quad (1\text{-}22)$$

In this equation, Clip3 is a function to clip a given value within a certain range defined by two threshold values. More exactly, Clip3 is defined as: Clip3(x, y, z)=(z<x?x:z>y? y:x). In other words, Clip3 function is used to clip a given value z to be within a range of [x, y].

The chroma filter coefficients and the coefficients $f_C(j)$ filter clipping values $c_C(j)$, j=0 . . . 5, are derived by altIdx and AlfCoeff$_C$[i], which are index of coefficients set and coefficients sets that are signaled from encoder, respectively.

$$f_C(j)=\text{AlfCoeff}_C[\text{slice\_alf\_aps\_id\_chroma}][\text{altIdx}][j] \quad (1\text{-}23)$$

$$c_C(j)=\text{AlfClip}_C[\text{slice\_alf\_aps\_id\_chroma}][\text{altIdx}][j] \quad (1\text{-}24)$$

During the past decade, the neural network technique, e.g., fully-connected neural network (FC-NN), convolutional neural network (CNN), and long short-term memory network (LSTM), have achieved success in many research domains.

Figure 7:
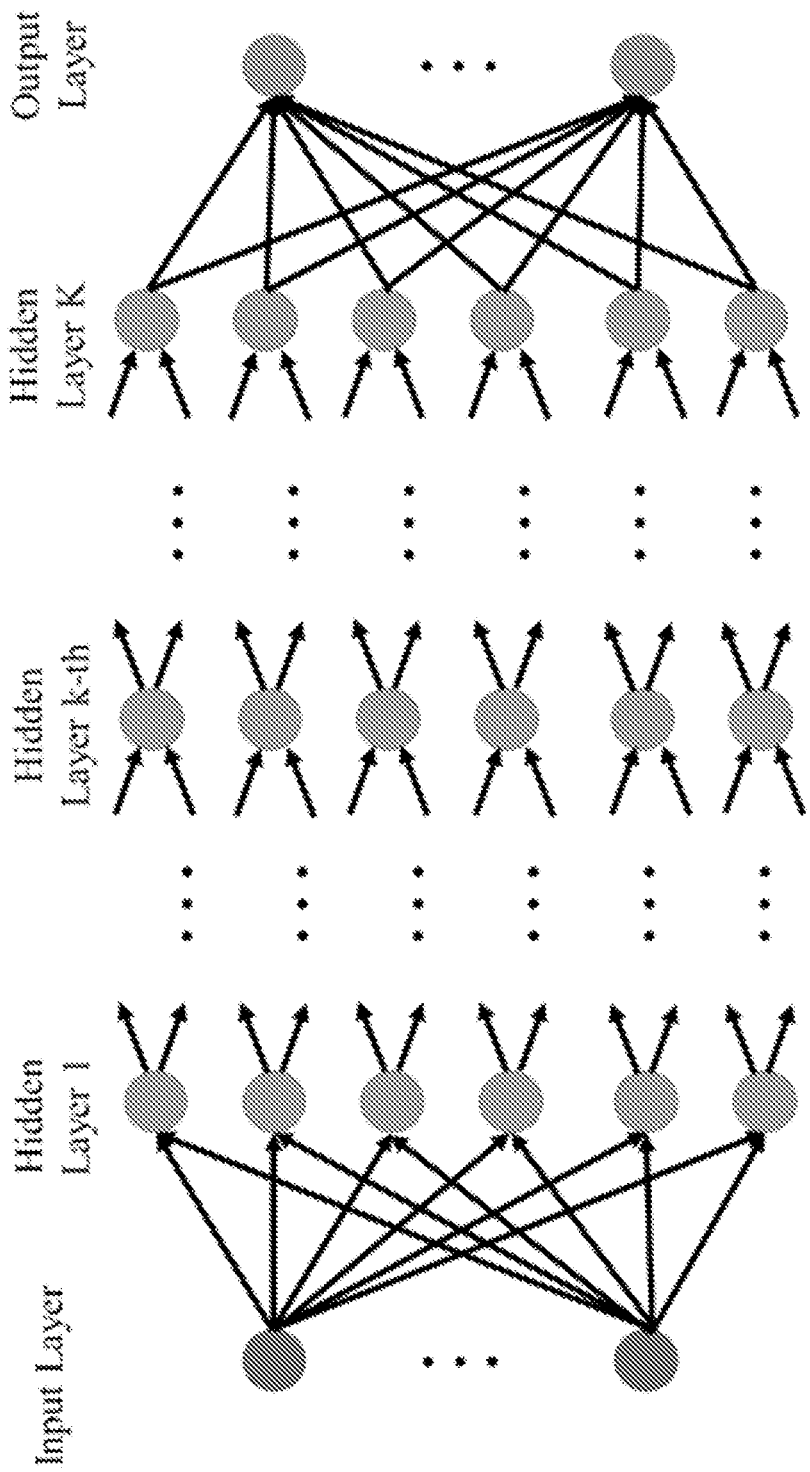
FIG. 7 is a block diagram illustrating a Fully Connected Neural Network (FC-NN), in accordance with some implementations of the present disclosure.

In some embodiments, a Fully-connected Neural Network (FC-NN) is further described below. FIG. 7 is a block diagram illustrating a Fully Connected Neural Network (FC-NN), in accordance with some implementations of the present disclosure. A simple FC-NN, as shown in FIG. 7, is consisting of input layer, output layer, and multiple hidden layers. At k-th layer, the output $f^k(x^{k-1}, W^k, B^k)$ comprises $$f^k(x^{k-1}, W^k, B^k) = \breve{\partial}(x^{k-1} \times W^k + B^k) \quad (2\text{-}25)$$

$$_M x k - 1] \cdot \begin{bmatrix} W_{1,1}^k & \cdots & W_{0,N}^k \\ \vdots & \% & \vdots \\ W_{M,1}^k & \cdots & W_{M,N}^k \end{bmatrix} + [B_1^{k-1}, \ldots, B_j^{k-1}, \ldots, B_M^{k-1}] \quad (2\text{-}26)$$

Where $x^{k-1} \subset R^M$ is the output of (k−1)-th layer, $W^k \subset R^{M \times N}$ and $B^k \subset R^N$ are the weight and the bias at k-th layer. $\breve{\partial}(\cdot)$ is the activation function, e.g., the Rectified Linear Unit (ReLU) function as defined in Eq. (2-3).

$$\breve{\partial}(x) = \begin{cases} 0, & x < 0 \\ x, & x \le 0 \end{cases} \quad (2\text{-}27)$$

Therefore, the general form of a K-layer FC-NN is written as $$FCNN(x) = f^K(\ldots f^k(f^{k-1}(\ldots f^1(x, W^1, B^1) \ldots), W^k, B^k) \ldots, W^K, B^K), \text{ for } 1 \le k \le K \quad (2\text{-}28)$$

According to the universal approximation hypothesizes and Eq. (2-4), given any continuous function g(x) and some s>0, there exists a neural network f(x) with a reasonable choice of non-linearity e.g., ReLU, such that ∀x, |g(x)−f(x)|<s. In some embodiments, neural network is applied as an approximator to mimic a model with hidden variables in order to extract explainable features under the surfaces. For example, applying in image recognition, FC-NN helps researchers to construct a system that understands not just a single pixel, but increasingly much deeper and complex sub-structures, e.g., edges, textures, geometric shapes, and objects.

Figure 8:
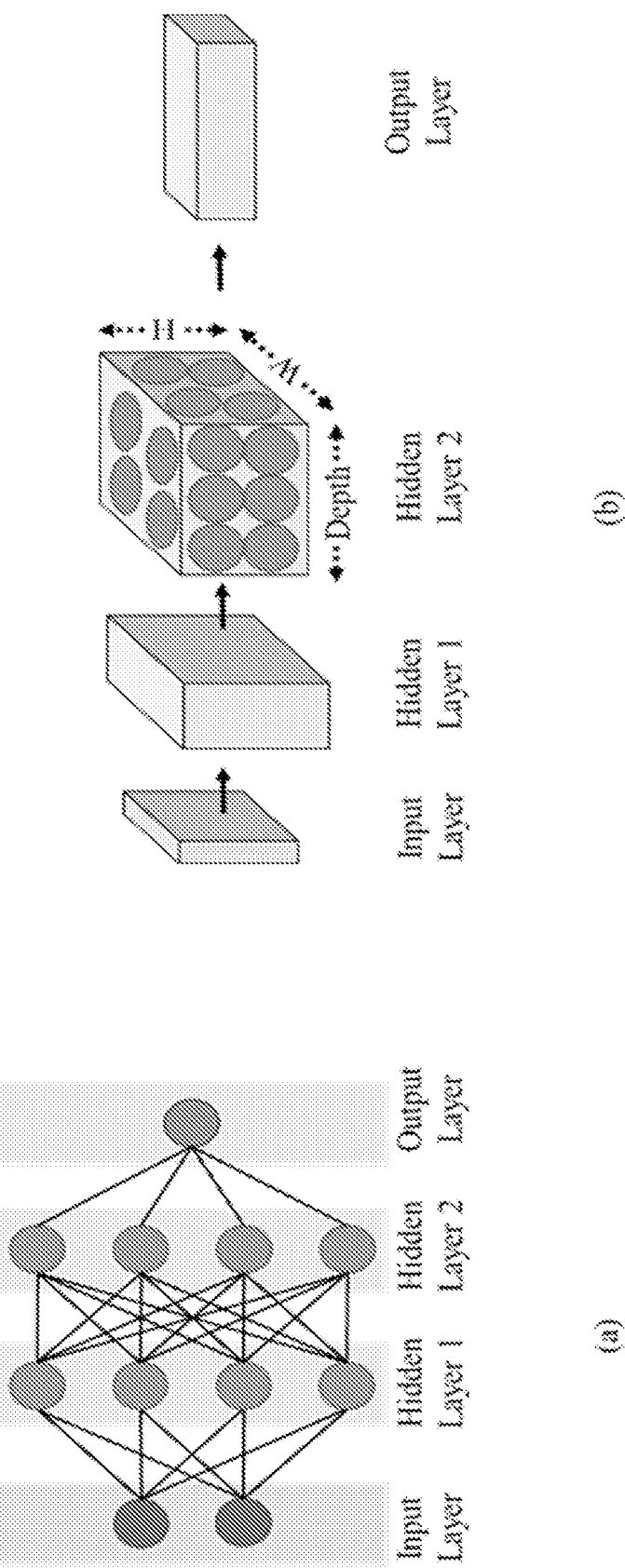
FIG. 8 is a block diagram illustrating the similarity between FC-NN and Convolutional Neural Network (CNN), in accordance with some implementations of the present disclosure.
Figure 9:
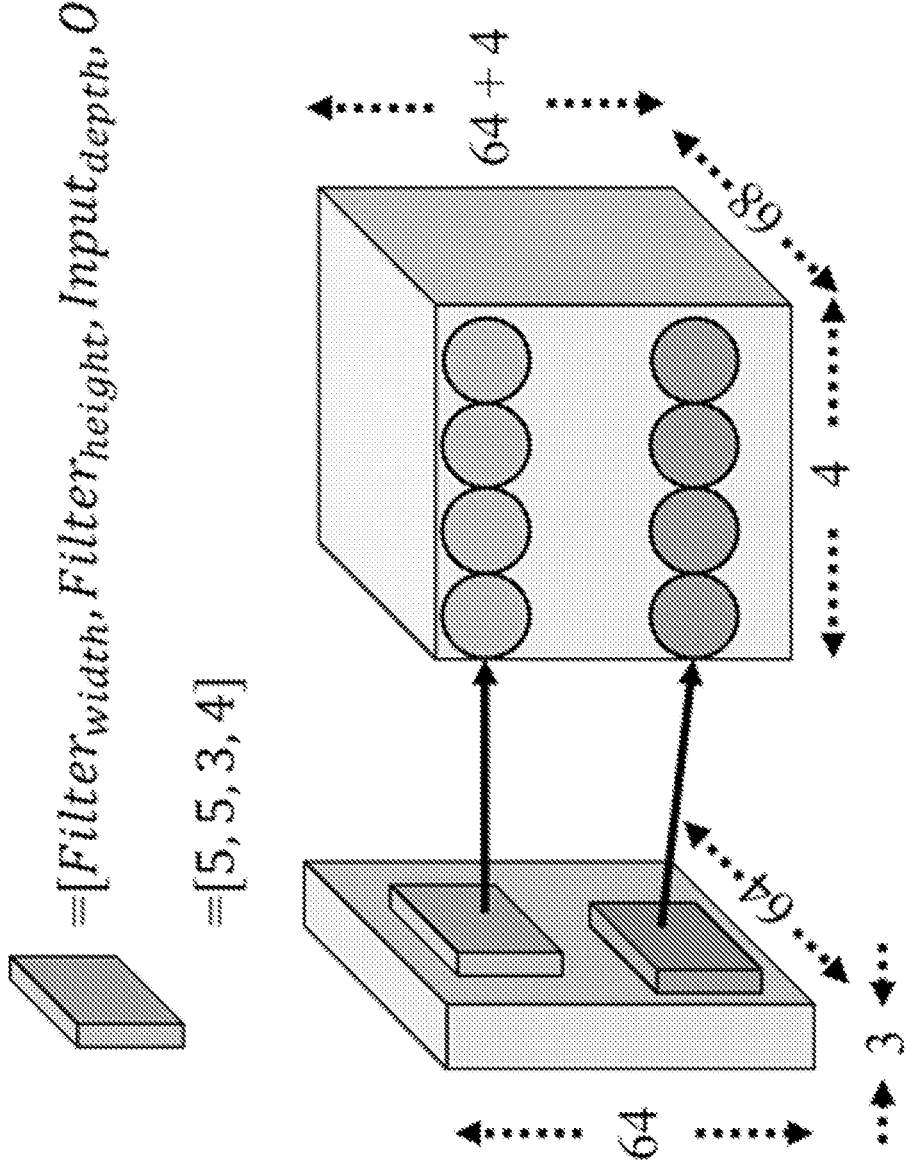
FIG. 9 is a block diagram illustrating spatial filters with dimension [5, 5, 3, 4] applied with an input 64×64×3 image, in accordance with some implementations of the present disclosure.

In some embodiments, Convolutional Neural Network (CNN) is further described below. FIG. 8 is a block diagram illustrating the similarity between FC-NN and CNN, in accordance with some implementations of the present disclosure. FIG. 8(*a*) shows FC-NN with 2 hidden layers. FIG. 8(*b*) shows an example of CNN, and the dimension of second hidden layer of CNN is [W, H, Depth]. As a popular neural network architecture for image/video applications, CNN is very similar to the FC-NN as shown FIG. 8(*a*), which comprises weights and bias metrices. A CNN can be seen as a 3-D version of neural network. In FIG. 8(*b*), neurons are arranged in 3-Dimensional structure (width, height, and depth) to form a CNN, and the second hidden layer is visualized. In this example, the input layer holds input image or video frames therefore its width and height are the same as the input data. To apply with image or video applications, each neuron in CNN is a spatial filter element with extended depth aligned with its input, e.g., the depth is 3 if there are 3 color components in the input images. FIG. 9 is a block diagram illustrating spatial filters with dimension [5, 5, 3, 4] applied with an input 64×64×3 image, in accordance with some implementations of the present disclosure. FIG. 9 also shows that extra 2 pixels are padded for convolutional operation. As shown in FIG. 9, the dimension of basic element in CNN is defined as [Filterwidth, Filterheight, Inputdepth, Outputdepth] and set to [5, 5, 3, 4] in this example. Each spatial filter performs 2-dimensional spatial convolution with 5*5*3 weights on input image, and then, outputs 4 convolutional results. Therefore, the dimension of filtered results are [64+4, 64+4, 4] if the boundary is padded with additional 2 pixels.

Figure 10:
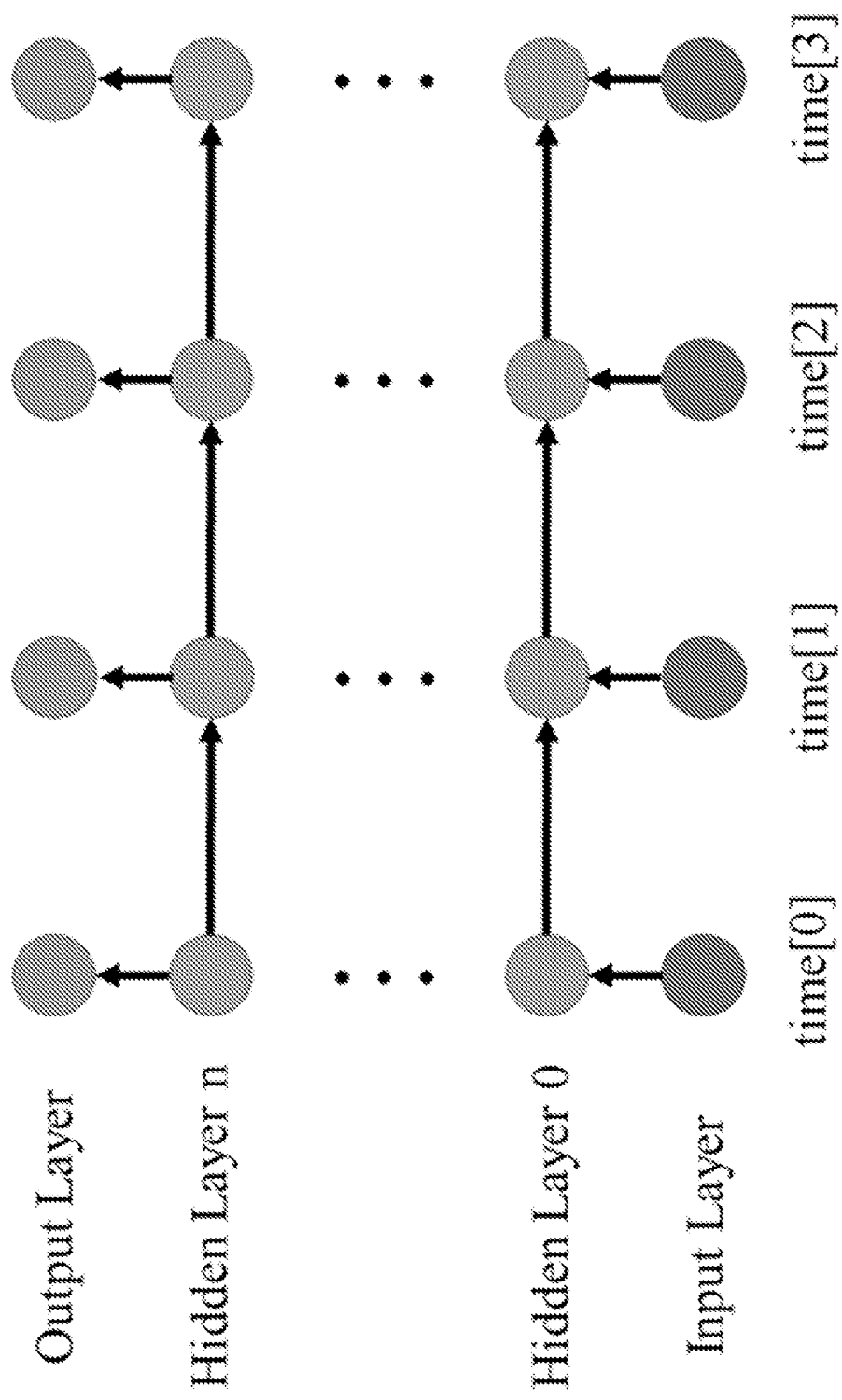
FIG. 10 is a block diagram illustrating Long Short-term Memory Network (LSTM), in accordance with some implementations of the present disclosure.

In some embodiments, Long Short-term Memory Neural Network (LSTM) is discussed in detail below. FIG. 10 is a block diagram illustrating Long Short-term Memory Network (LSTM), in accordance with some implementations of the present disclosure. Considering the order of data, the input of hidden layer in LSTM contains both the output of previous layer and its own output as shown in FIG. 10. LSTM is a network architecture for solving time dependent problem.

Figure 11:
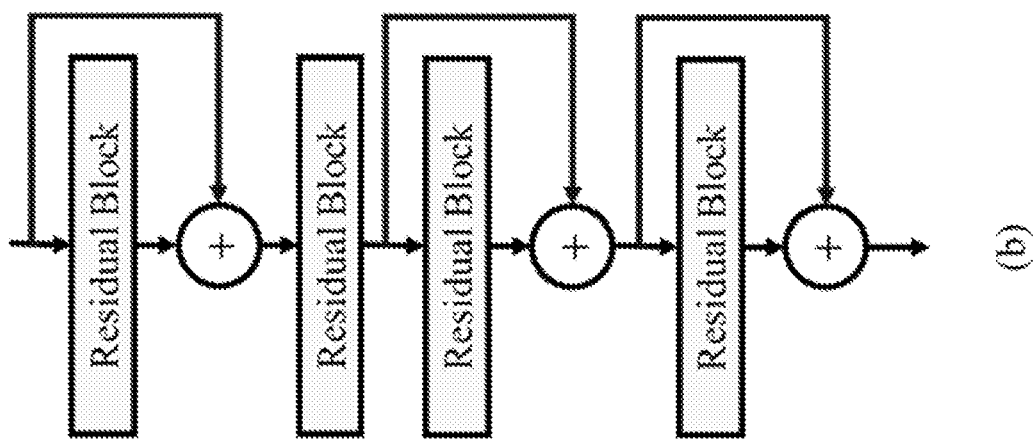
FIG. 11 is a block diagram showing a Residual Network (ResNet), in accordance with some implementations of the present disclosure.
Figure 11:
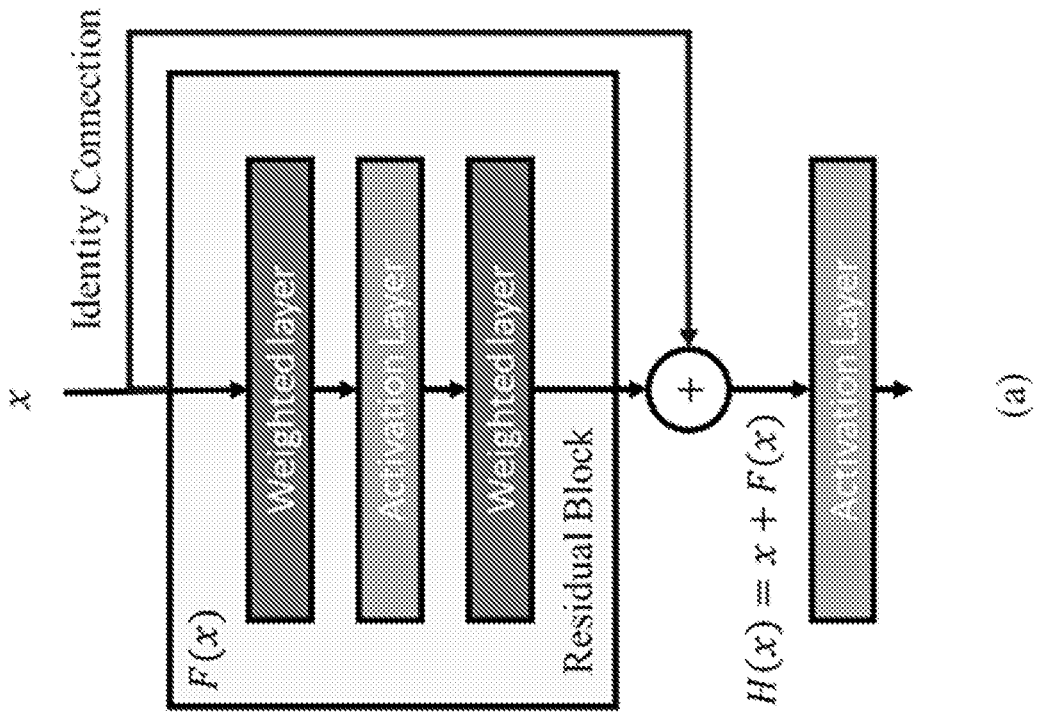

FIG. 11 is a block diagram showing a Residual Network (ResNet), in accordance with some implementations of the present disclosure. FIG. 11(*a*) shows that residual block as the element of ResNet is element-wise added with its input by identity connection. FIG. 11 (*b*) shows an example of staking residual block for ResNet. Several studies in image classification revealed that the accuracy is saturated and degrades rapidly when the depth of neural network increases. To be more specifically, adding more layers on deep neural network results in higher training error because the gradient is gradually vanishing along the deep network and toward to zero gradient at the end. In some embodiments, the Residual Network (ResNet) composed of residual blocks is applied to resolve the degradation problem by introducing the identity connection.

As shown in FIG. 11(*a*), a basic module of ResNet consists of the residual block and the identity connection. According to the universal approximation hypothesis, given an input x, weighted layers with activation function in residual block approximate a hidden function F(x) rather than the output H(x)=F(x)+x.

By stacking non-linear multi-layer neural network, the residual block explores the features that represent the local characteristic of input images. Without introducing neither additional parameters nor computational complexity, the identity connection is proven to make deep learning network trainable by skipping one or more non-linear weighted layers as shown in FIG. 11(*a*). Skipping weighted layers, the differential output of the residual layers can be written as $$\frac{\delta K(s)}{\delta s} = \frac{\delta F(s)}{\delta s} + 1 \quad (3)$$

Therefore, even if the differential term $$\frac{\delta F(s)}{\delta s}$$

is gradually decreasing toward zero, the identity term can still carry on and pass the input to the next layer instead of being stuck at zero gradient as well as blocking information propagation. In theory, if a neuron cannot propagate information to the next neuron, it is seen as dead neuron, which is non-trainable element in neural network. After addition, another non-linear activation function can be applied as well. FIG. 11(*b*) is an example of ResNet by staking residual modules, where the residual features are fused with the identity features before propagating to the next module.

Figure 12:
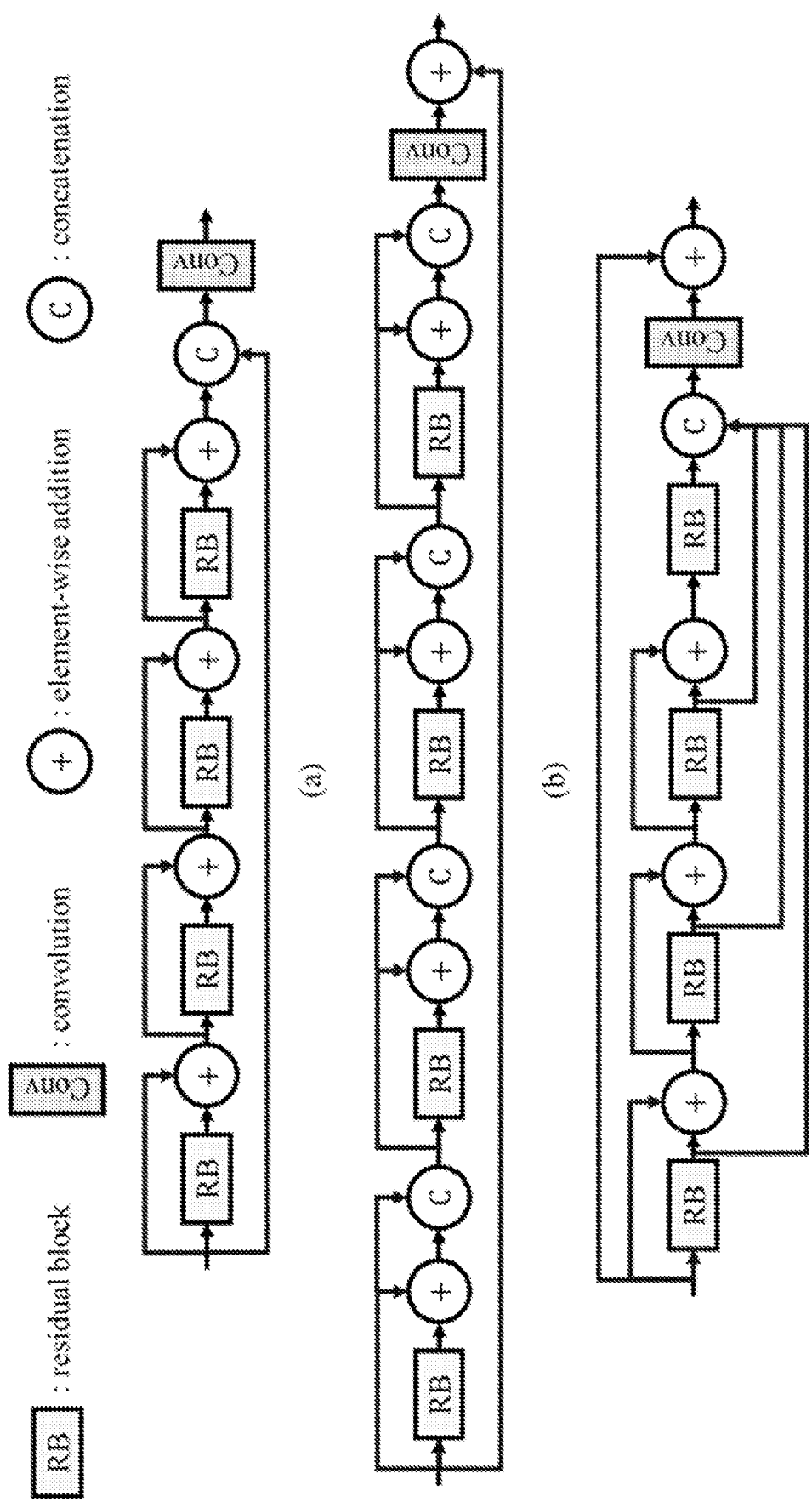
FIG. 12 is a block diagram showing several variations of for improving the recovered image quality for single image super-resolution (SISR) and increasing the accuracy for image classification, in accordance with some implementations of the present disclosure.

FIG. 12 is a block diagram showing several variations of for improving the recovered image quality for single image super-resolution (SISR) and increasing the accuracy for image classification, in accordance with some implementations of the present disclosure. For example, FIG. 12(a) shows residual block with global identity connection. FIG. 12(b) shows ResNet with concatenation architecture. FIG. 12(c) shows an aggregation ResNet.

In FIG. 12(a), a variation of ResNet is used to enhance the visual quality of the up-sampled images. Specifically, a global identity connection is applied from the input of the first residual block to the output of last residual block in order to facilitate the convergence of training procedure.

In FIG. 12(b), another variation of ResNet stacks multiple residual blocks in order to further improve the video coding efficiency. Each residual block directly propagates its own input to the following unit by concatenation operation. In other words, each intermediate block can receive multi-hierarchical information from its preceding units because multi-level information can flow through the identical connection. In some examples, the parameter of each residual block in FIG. 12(b) is linearly increased with the number of layers because of the concatenation operation.

In FIGS. 12(a) and 12(b), before the residual information can be propagated to the later module, the residual features have to go through one or several modules. Due to the identity connection, these residual features can be rapidly coupled with identity features at certain layer and stop propagating to succeeding module. Therefore, the residual features in the previous two variations are limited locally that results in performance degradation.

In FIG. 12(c), another variation of ResNet is used to tackle SISR by aggregating the output of residual blocks. In this variation, the output of the last residual block is concatenated with all the output of the previous three modules. Before applied with element-wise addition with the input of the first residual block, the concatenated hierarchical features are fused by the convolutional operation. Different from the first two variations, aggregated ResNet makes non-local features applicable to the last residual module so that the hierarchical information can be propagated to succeeding blocks, achieving the feature representation in a more discriminative way.

Figure 13:
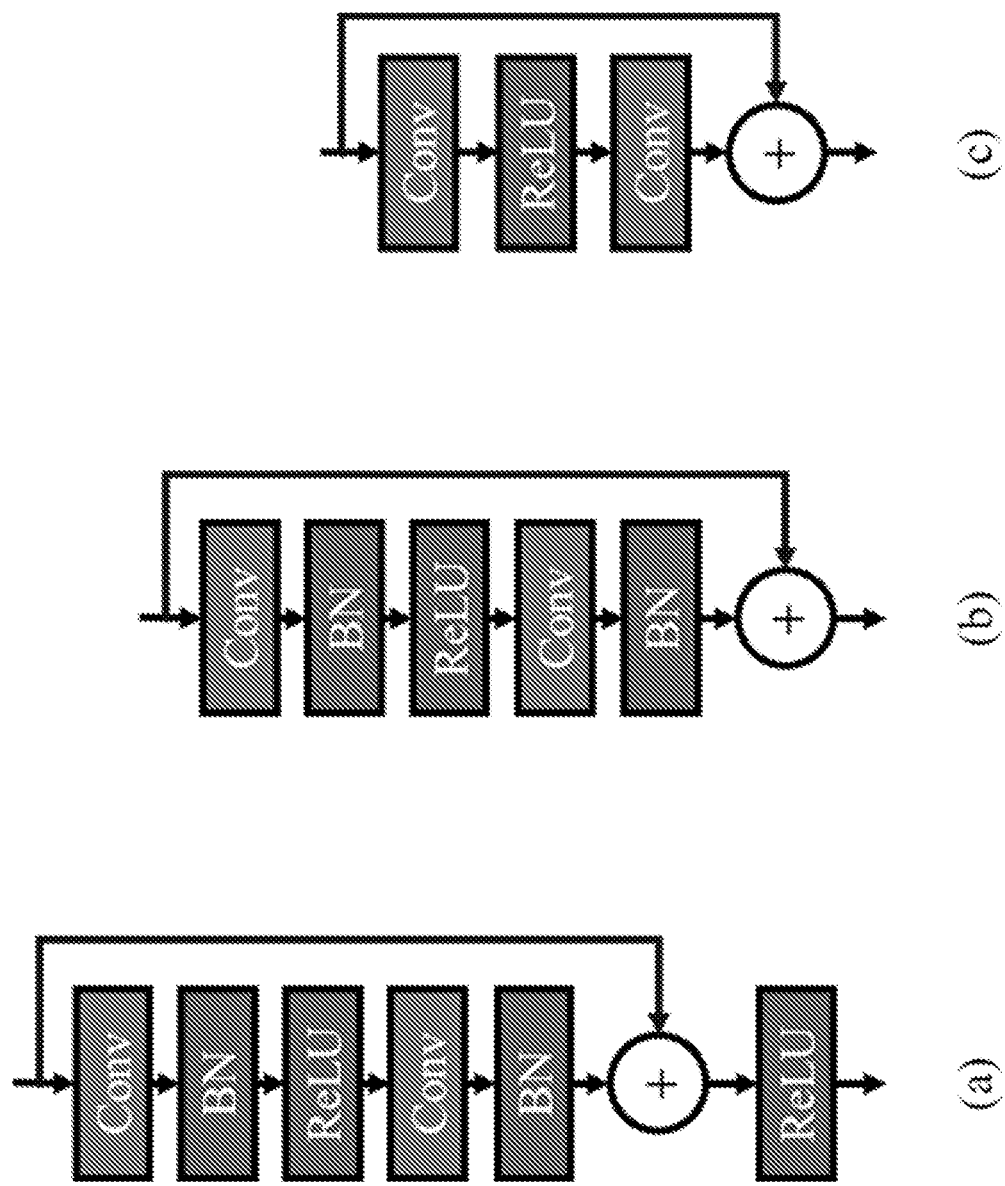
FIG. 13 is a block diagram showing variations of residual blocks of a neural network, in accordance with some embodiments of the present disclosure.

FIG. 13 is a block diagram showing variations of residual blocks of a neural network, in accordance with some embodiments of the present disclosure. FIG. 13(a) shows a variant residual block for enhance picture quality of SISR. FIG. 13(b) shows a residual block without the last non-linear layer. FIG. 13(c) shows a residual block without batch normalization.

In one example, the basic residual block is shown in FIG. 13(a). Two convolution layers are stacked together, followed by a batch normalization and a non-linear activation function. The output of second batch normalization is element-wise added with the input of first convolutional layer. The final result is applied with another non-linear activation.

A modified residual block is shown in FIG. 13(b). Inspired by the original residual block, it is the first implementation to inferring photo-realistic natural image for 4×upscaling factors. The last non-linear activation layer is removed from the variation. A further reduction of residual block is shown in FIG. 13(c). The batch normalization layers are removed since it limits the range flexibility of the features. The removing the batch normalization can enhance the picture quality for SISR.

Figure 14:
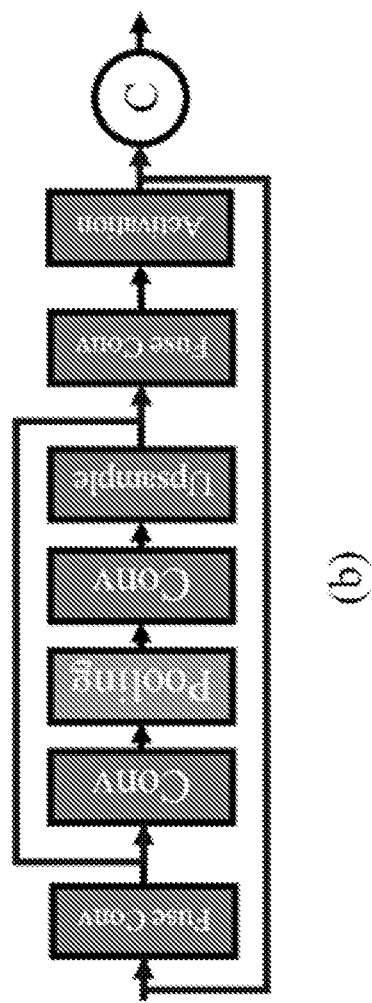
FIG. 14 is a block diagram illustrating enhanced spatial attention block (ESA), in accordance with some implementations of the present disclosure.
Figure 14:
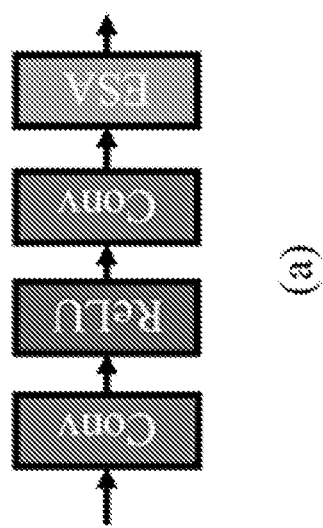

In some embodiments, the enhanced spatial attention block (ESA) is applied to improve the performance of ResNet. FIG. 14 is a block diagram illustrating an ESA, in accordance with some implementations of the present disclosure. As shown in FIG. 14, the ESA module is used with the aggregated ResNet for tackling the SISR. In FIG. 14(a), the ESA works at the end of the residual module. The most important sub-module is the pooling mechanism, which is the key for ESA to force feature to more focus on the spatial characteristic of region of interest.

Figure 15:
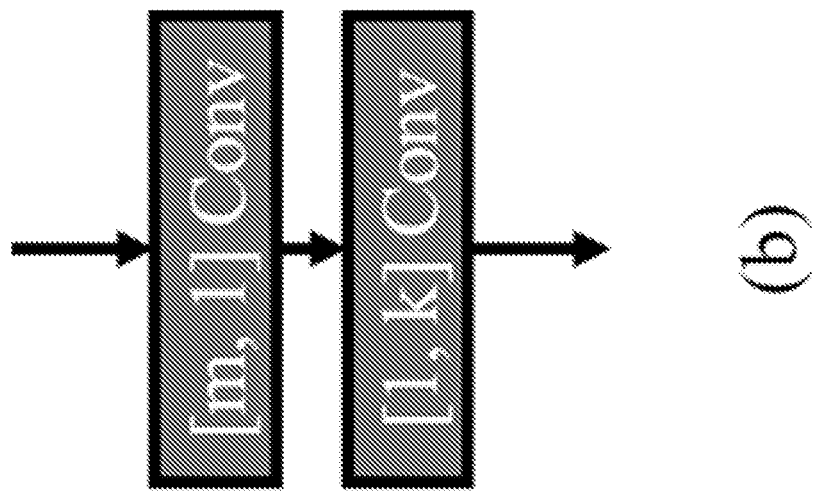
FIG. 15 is a block diagram showing variations of convolutional operation, in accordance with some implementations of the present disclosure.
Figure 15:
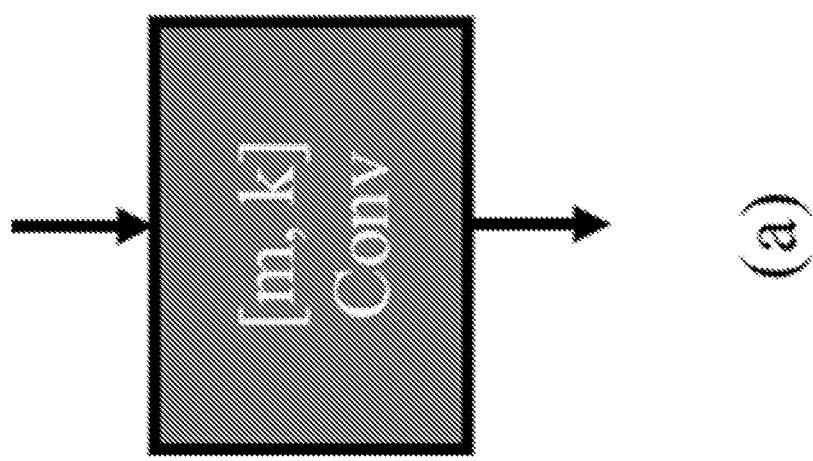

FIG. 15 is a block diagram showing variations of convolutional operation, in accordance with some implementations of the present disclosure. In order to reduce the number of parameters, spatial separable convolution (SepConv) is used to replace a classical convolutional operation. FIG. 15(a) shows a basic convolution that is 2-dimensional filter with its [width, height]=[N, k]. FIG. 15(b) shows a spatial separable convolution consisting of two consecutive 1-dimentional convolutions stacking together to approximate 2-dimensional convolutional operation.

Figure 16:
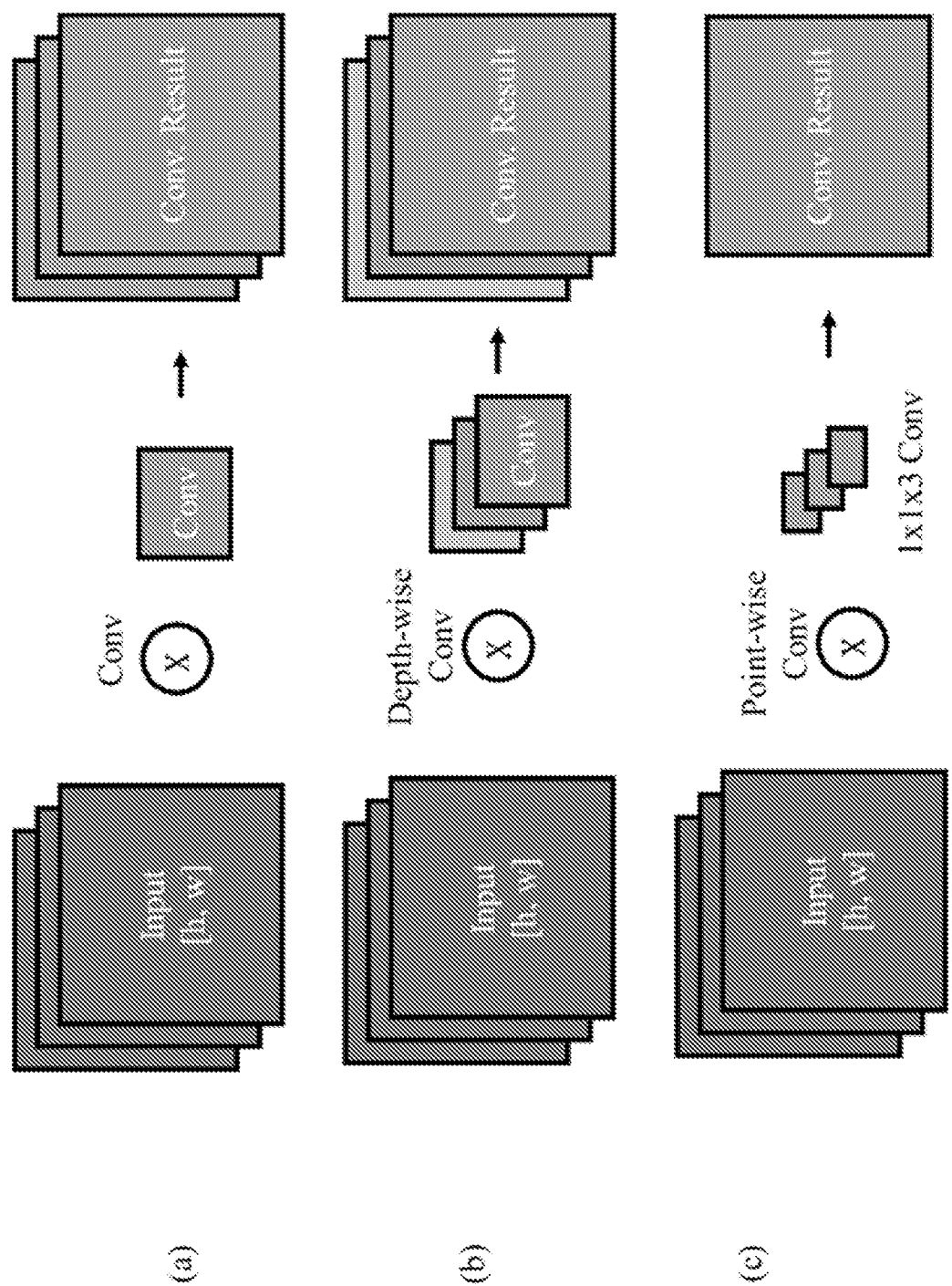
FIG. 16 is a block diagram showing variations of convolutional operation, in accordance with some implementations of the present disclosure.

FIG. 16 is a block diagram showing variations of convolutional operation, in accordance with some implementations of the present disclosure. FIG. 16(a) shows a 2-dimentional convolution on 3-color components image with its height and width equal to w and h, respectively. FIG. 16(b) shows a depth-wise convolution. FIG. 16(c) shows a point-wise convolution.

In FIG. 16(a), the classical 2-dimensional convolution is applied with 3-channel input image and constructs convolutional result in 3 channels. The number of channels in convoluted result is the same as the input.

In some examples, since the characteristics of different color components may not have similar distribution, a depth-wise convolution (DWC) is implemented to perform different convolutional filters on each color space. In FIG. 16(b), three 2-dimensional convolutional filters, i.e., orange, green, and yellow filter, are applied with input and produce convolutional result in three independent spaces.

The depth-wise convolution produces result in three independent spaces without transforming the characteristic of input into the features. In order to combine the independently convolutional results from depth-wise operation, point-wise convolution (PWC) is implemented as in FIG. 16(c), for example, a 1×1×3 point-wise is applied with 3-channel input and assembles input into one channel result.

Figure 17:
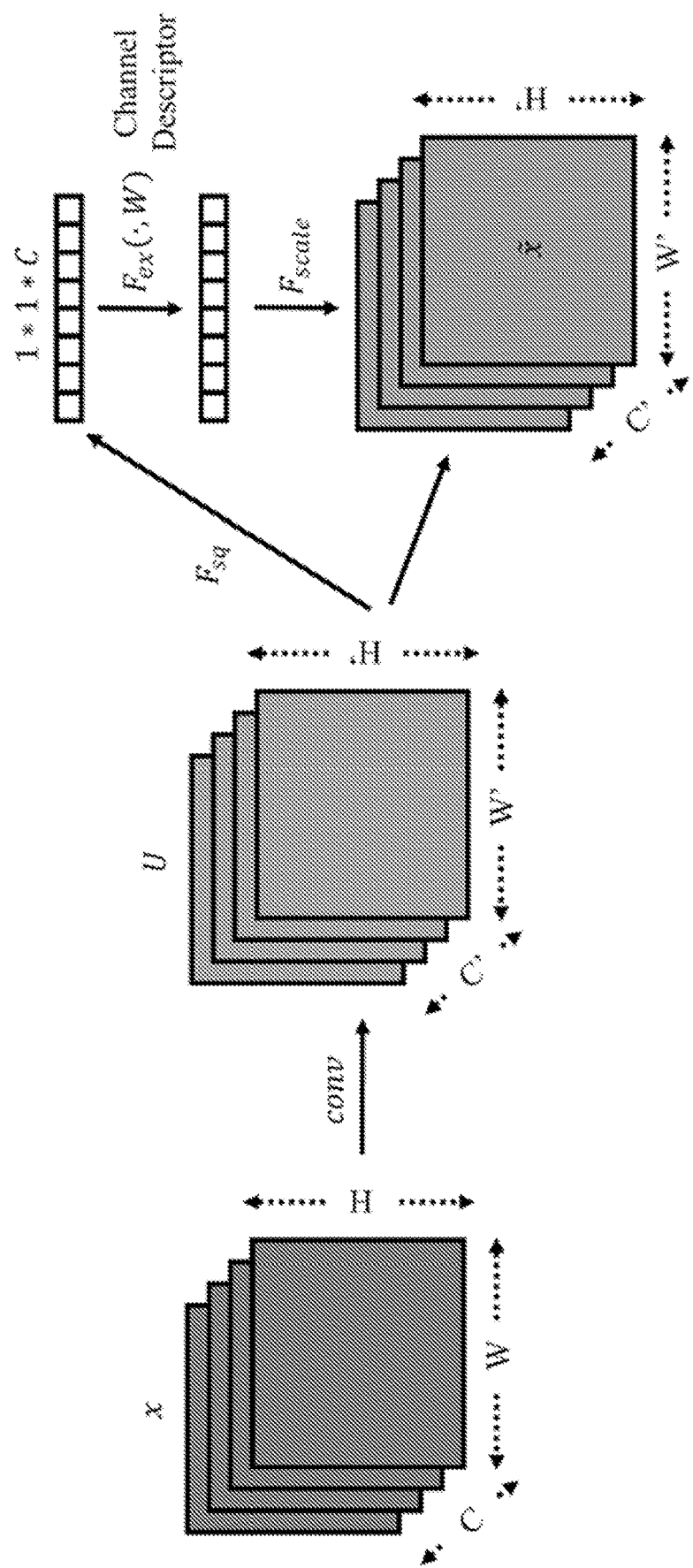
FIG. 17 is a block diagram showing Squeeze-and-Excitation Net (SENet), in accordance with some implementations of the present disclosure.

FIG. 17 is a block diagram showing Squeeze-and-Excitation Net (SENet), in accordance with some implementations of the present disclosure. Squeeze-and-Excitation block is used along with CNN to form SENet, which explicitly models the interdependency between channels and global activities of images. In FIG. 17, feature maps, U, are squeezed to form a channel descriptor by a global average pooling operation $F_{cq}$.

$$F_{cq}(U) = \frac{1}{M \times K} \sum_{j}^{K} \sum_{i}^{M} u_c(i, j) \qquad (4)$$

In order to capture the channel-wise dependencies, the channel descriptor is applied with a FC-NN, $F_{es}(\cdot, W)$. For the simplicity and generalization, $F_{es}(\cdot, W)$ can consist of two fully-connected layers, i.e., a dimensional reduction layer, an activation layer, and a dimensional increasing layer to scale up the channel dimension that is equal to U. The last step is a scalar scaling matrix and blending the output of $F_{es}(\cdot, W)$ with U to form the estimation x.

In some embodiments, the systems and methods disclosed herein are focused on developing algorithms on applying neutral network as in-loop/post-loop filters to further improve the coding efficiency of current hybrid video coding.

In some embodiments, an improved training process by training preprocessing data is implemented. For example, a large amount of training data is typically exploited to improve a model generalization. The diverse characteristics (e.g., resolution, bit-depth, YUV sampling ratio) of different data sets require the input layers of a neural network architecture to be flexible enough, which is hard to be designed. The preprocessing of the training data may be performed such that the input layers of a neural network architecture can be uniformly designed. Besides, a well-preprocessed set of training data may lead to a quicker and more effective convergence of a training process. Specifically, the following methods are implemented to pre-process the training data to improve the efficiency of the trained network.

In some embodiments, patch generation is used to improve the efficiency of the trained network. The input to a neural network may be with a fixed spatial resolution. Given a selected data set such as Div2K with different picture or video frame resolutions (e.g., 720p, 1080P), these reconstructed images/video frames may be randomly selected and segmented into multiple patches with one or multiple specific spatial resolutions (e.g., 128×128). Specifically, the original pictures/videos in the selected data set(s) may be up-sampled or down-sampled to different resolutions before encoded and reconstructed. The reconstructed images/video frames may be grouped with different quantization parameters before patching segmentations and then fed into the neural network separately or jointly. The segmented patches may or may not be augmented with randomly selected rotation degrees or/and flip directions. The spatial resolution of the segmented patches may be determined according to the data content, named content aware patch segmentation. For example, if an image/video frame contains small objects, the spatial resolution may be smaller accordingly.

In some embodiments, bit-depth selection is used to improve the efficiency of the trained network. An encoder may use an internal bit-depth different from the bit-depth of the original picture or video frame before compression and reconstruction. During the patch generation, the samples in each output patch may contain only integer-pel sample values or fractional-pel sample values.

If the output patch contains fractional bits, the bit-depth/precision of each path is higher than the original picture or video frame. Herein, the fractional-pel sample values refer to a number of bits at least significant bit (LSB) positions of the patch signal. In this case, the output patch may contain noised sample values. In one embodiment, certain data-processing layers may or may not be needed in the neural network so that zero-centered data or normalized data can be obtained.

If the output patch does not contain fractional bits, the bit-depth/precision of each patch is the same as the original picture or video frame. In this case, certain data-processing layers (e.g., zero-centered data or normalized data) may still or may not be present in the neural network. In one embodiment, the data-processing layers may be utilized to reduce the model parameters' precision.

In some embodiments, deblock filtering control is used to improve the efficiency of the trained network. The deblocking filter is typically applied to attenuate artifacts on coded block boundaries. Before the patch generation, the reconstructed images/video frames may be obtained with or without applying the deblocking filter. In one embodiment, the deblocking filter may not be applied to the training data such that the training process can better learn and adapt to the encoder behaviors as the training data maintains the existing blocking artifacts. In another embodiment, the deblocking filter may be applied to the training data such that better perceptual quality of training data may help training process converging to enhanced the visual quality.

Figure 18:
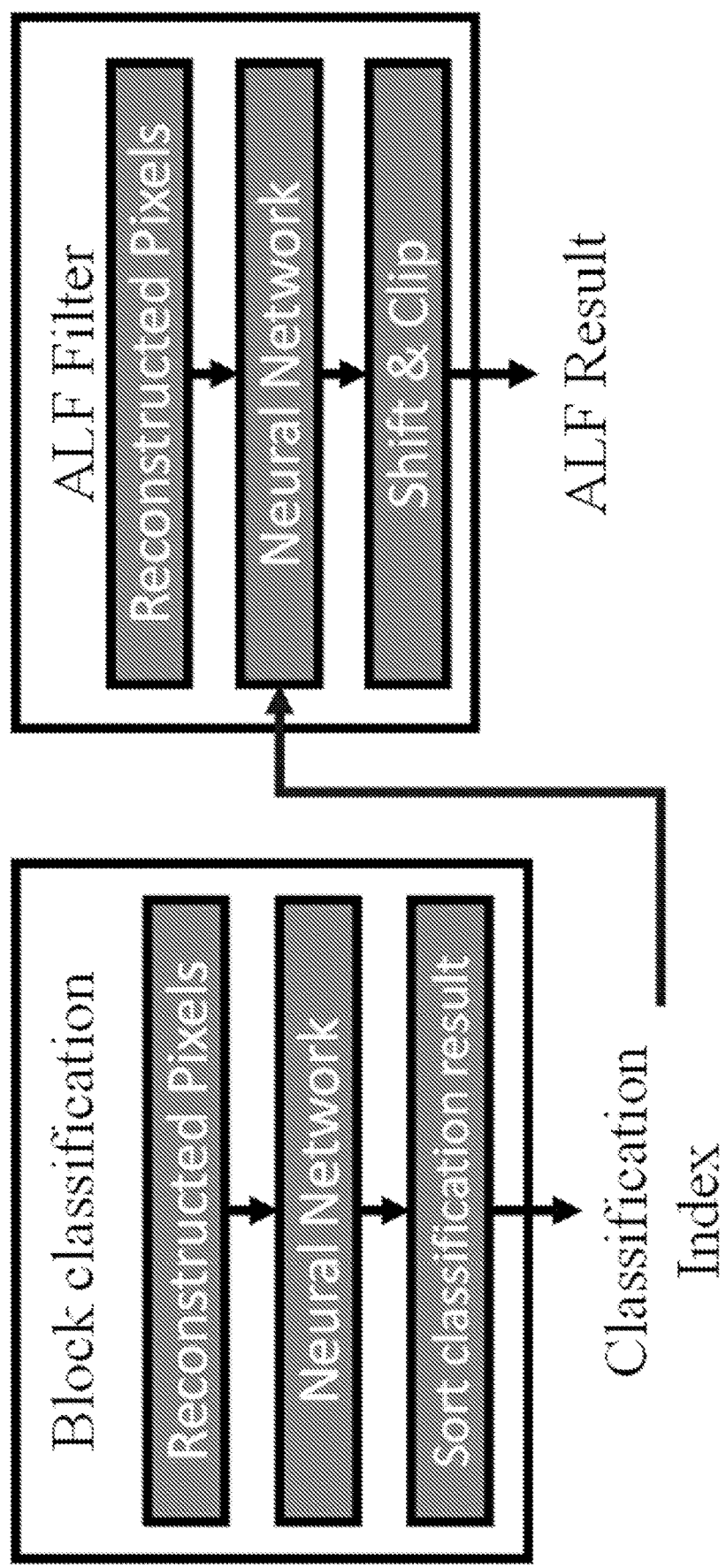
FIG. 18 is a block diagram illustrating a decoder-side NN-ALF, in accordance with some implementations of the present disclosure.

In some embodiments, neural-network-based ALF (NN-ALF) is implemented. In one or more embodiments, a neural network is applied with ALF. FIG. 18 is a block diagram illustrating a decoder-side NN-ALF, in accordance with some implementations of the present disclosure. The block classification is realized by a neural network, e.g., FC-NN, CNN, and/or the combination of both, and produces the filter index according to the local characteristic. The filter coefficient of NN-ALF can be obtained by a neural network, e.g., FC-NN, CNN, and/or the combination of both, with the classification index. The clip and shift operation are also applied with filter operation in the decoder-side of NN-ALF in order to prevent overflow so that filtered result can be represented by certain number of bits.

Figure 19:
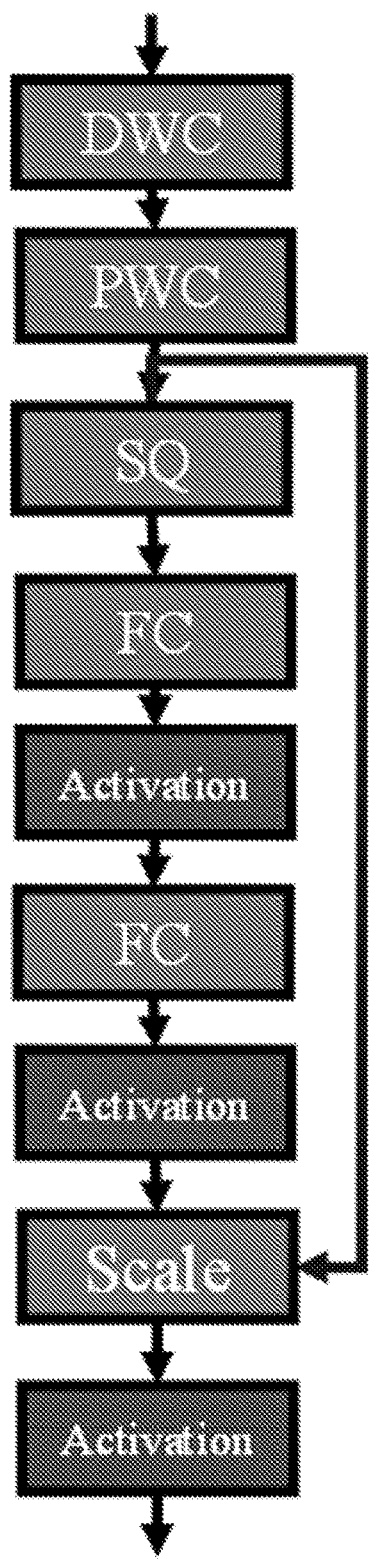
FIG. 19 is a block diagram showing an architecture of the combination of depth-wise convolution (DWC), point-wise convolution (PWC), and SENet, in accordance with some implementations of the present disclosure.

In some embodiments, combination of DWC, PWC, and squeeze-and-excitation module with ResNet is implemented. As described above, the variant version of ResNet still requires several million bytes memory of parameters, which is burdensome for the video coding system. In one or more embodiments, depth-wise and point-wise separable convolution is applied with SENet. Since the SENet can reduce the parameter by introducing two FC-NNs after the first convolutional output, the intermediate parameter can be further reduced. FIG. 19 is a block diagram showing an architecture of the combination of DWC, PWC, and SENet, in accordance with some implementations of the present disclosure. The DWC and PWC replaces the classical convolution, followed by the SQ (Squeeze module), which constructs the channel-wise features by aggregating in spatial dimensions.

In the original SEnet, the SQ module averages the feature in spatial domain. The uniform average operation does not take the local characteristic into account. In one or more embodiments, a weighted and non-uniform matrix for SQ module is applied. The matrix for SQ module can be a trained result from a neural network, e.g., FC-NN, CNN, and/or LSTM. The matrix for SQ module can be a pre-defined simple logic. One example is that the matrix contains the geometric distance between the position of pixel and the boundary of operation region. The operation region can be a CU, CTU, and/or tile in a picture frame.

Figure 20:
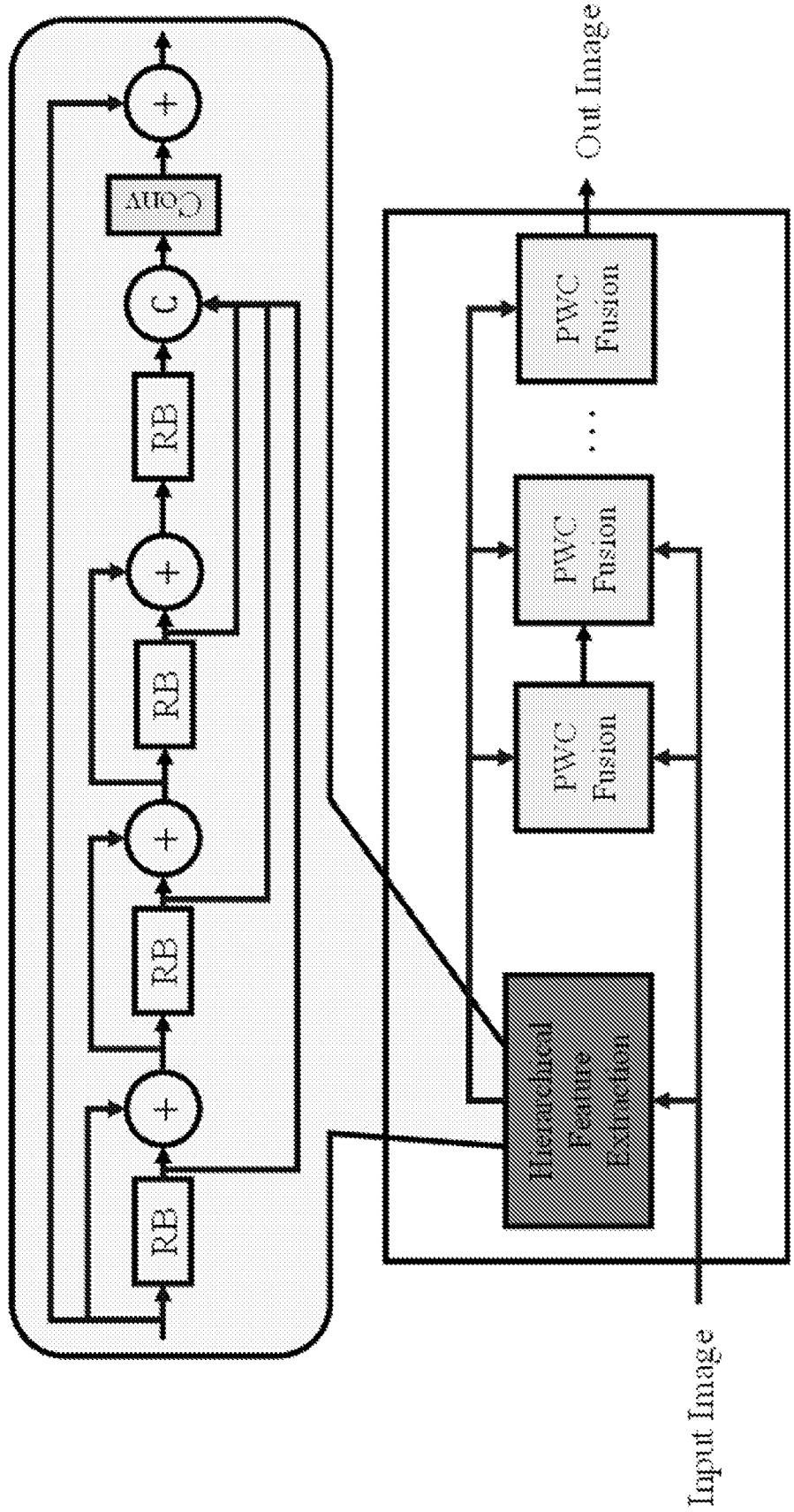
FIG. 20 is a block diagram showing the aggregation of ResNet with PWC, in accordance with some implementations of the present disclosure.

In some embodiments, the combination of ResNet and PWC for hierarchical feature extraction is implemented. As discussed above, ResNet reveals that the propagating of the hierarchical features along staked residual blocks can improve the quality of SISR. On the other hand, point-wise convolution (PWC) emphasizes the correlation of single pixel and its neighboring. In one or more embodiments, ResNet is applied with PWC. FIG. 20 is a block diagram showing the aggregation of ResNet with PWC, in accordance with some implementations of the present disclosure. The aggregated ResNet extracts hierarchical features from the input image. The PWC modules combine the spatial features to enhance the quality of input image.

In some embodiments, a modified ESA for in-loop filter is implemented. The ESA is used in tackling the SISR problem by introducing the spatial pooling with convolution and up-sampling modules. For in-loop filters, the correlation between the pixel and its neighboring may play a more critical role than the global characteristic. In one or more embodiments, the up-sample module of ESA is replaced with non-linear activation module for in-loop filtering in video coding.

In one or more embodiments, the up-sample module of ESA is removed for in-loop filtering in video coding.

In one or more embodiments, the last non-linear activation layer of ESA is removed for in-loop filtering of video coding.

Other examples of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only. It will be appreciated that the present invention is not limited to the exact examples described above and illustrated in the accompanying drawings, and that various modifications and changes can be made without departing from the scope thereof.

Figure 21:
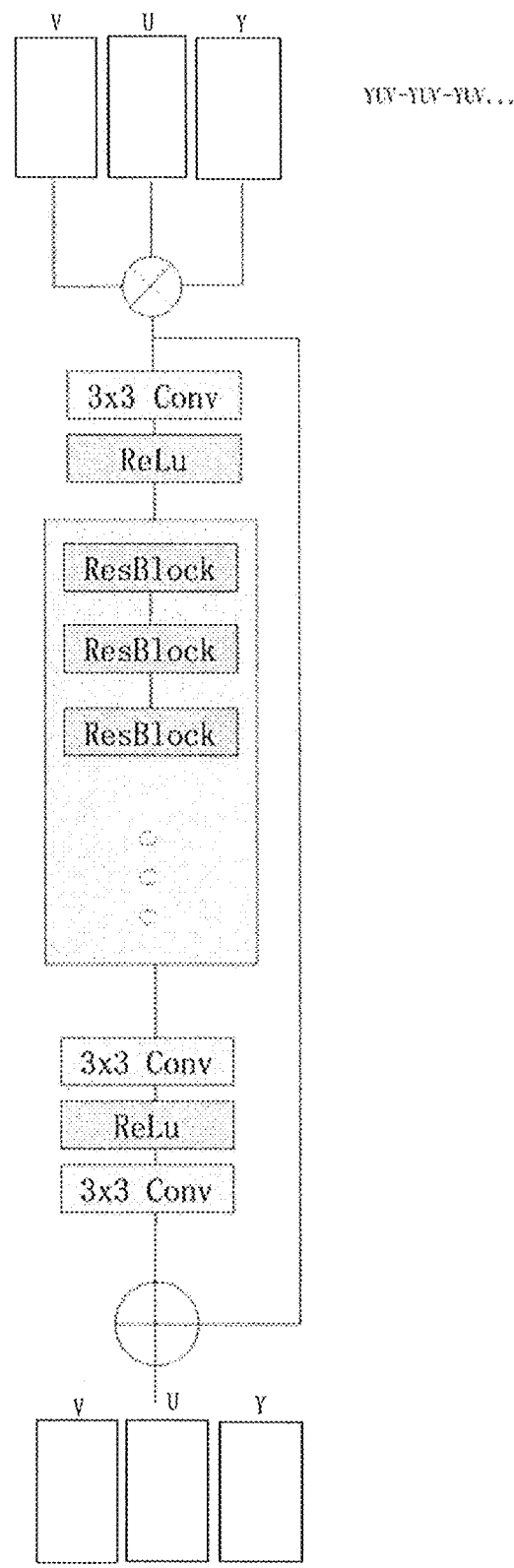
FIG. 21 is a block diagram illustrating a network architecture based on the ResNet structure that uses one single network to process luma and chroma component independently, in accordance with some implementations of the present disclosure.

In some embodiments, NN-based in-loop filter for jointly handling luma and chroma components is implemented. The conventional NN-based in-loop filters are mainly targeting at improving the quality of the reconstructed luma samples. However, due to the fact that the natural content usually contains three color components, various NN-based in-loop filtering methods are implemented herein which can jointly operates on both luma and chroma components. Firstly, the most straightforward solution is to reuse the same network structure of luma component for the two chroma components. FIG. 21 is a block diagram illustrating a network architecture based on the ResNet structure that uses one single network to process luma and chroma component independently, in accordance with some implementations of the present disclosure. As shown in FIG. 21, the Y, U and V channels of an image/video frame are split into patches in equal size (e.g. 64×64) and are fed into the network separately. In this case, the input signal (i.e., luma and chroma components) is treated equally by the network.

Figure 22:
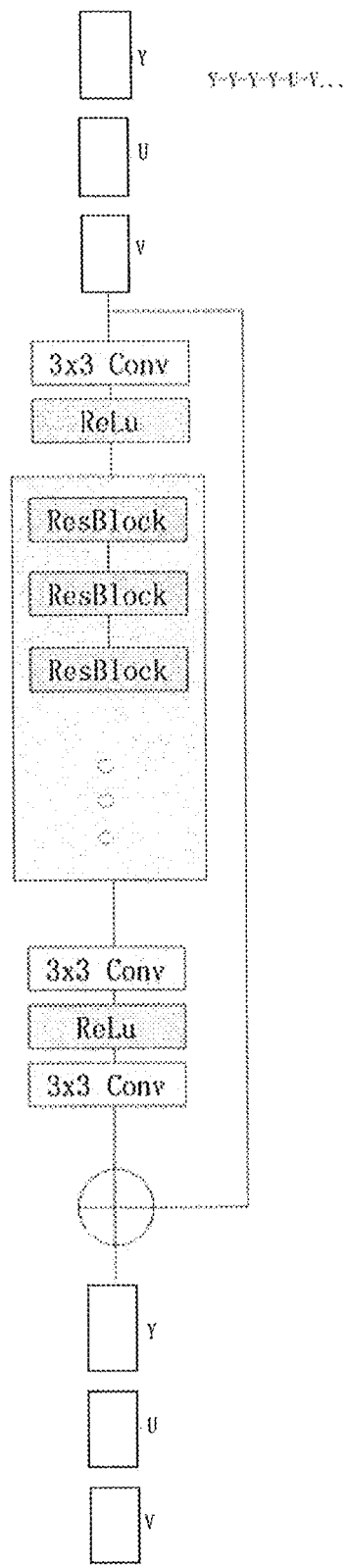
FIG. 22 is a block diagram illustrating a network architecture that uses one single network to process luma and chroma component jointly when the luma and chroma components are in one equal size, in accordance with some implementations of the present disclosure.

In a second method, to better exploit the correlation between the luma and chroma components, the luma and chroma components are concatenated and fed into the network jointly. FIG. 22 shows one example when such method is applied assuming luma and chroma component having the same resolution (e.g., RGB or YUV444). FIG. 22 is a block diagram illustrating a network architecture that uses one single network to process luma and chroma component jointly when the luma and chroma components are in one equal size, in accordance with some implementations of the present disclosure. Alternatively, when the luma and chroma components have different resolutions, the method firstly converts the samples of the chroma components to be in the same resolution of the luma component by up-sampling. Then, the samples of the up-sampled chroma components together with the samples of the luma components can be concatenated and fed into the convolutional network, e.g., ResNet. Correspondingly, the output chroma samples will be down-sampled back to its original resolution after the NN-based in-loop filter is applied.

To up-sample the chroma components, different methods may be applied. In one embodiment, simple copy is used to conduct the up-sampling and down-sampling operations. Specifically, by this method, each chroma samples in one 2-by-2 neighborhood in the up-sampled chroma plane are directly copied from the corresponding collocated chroma sample in the lower resolution plane. Correspondingly, at the end of the NN-based in-loop filter, only one chroma sample (e.g. the top-left sample) in each 2-by-2 chroma region will be kept to form the chroma plane in the original resolution.

Figure 23:
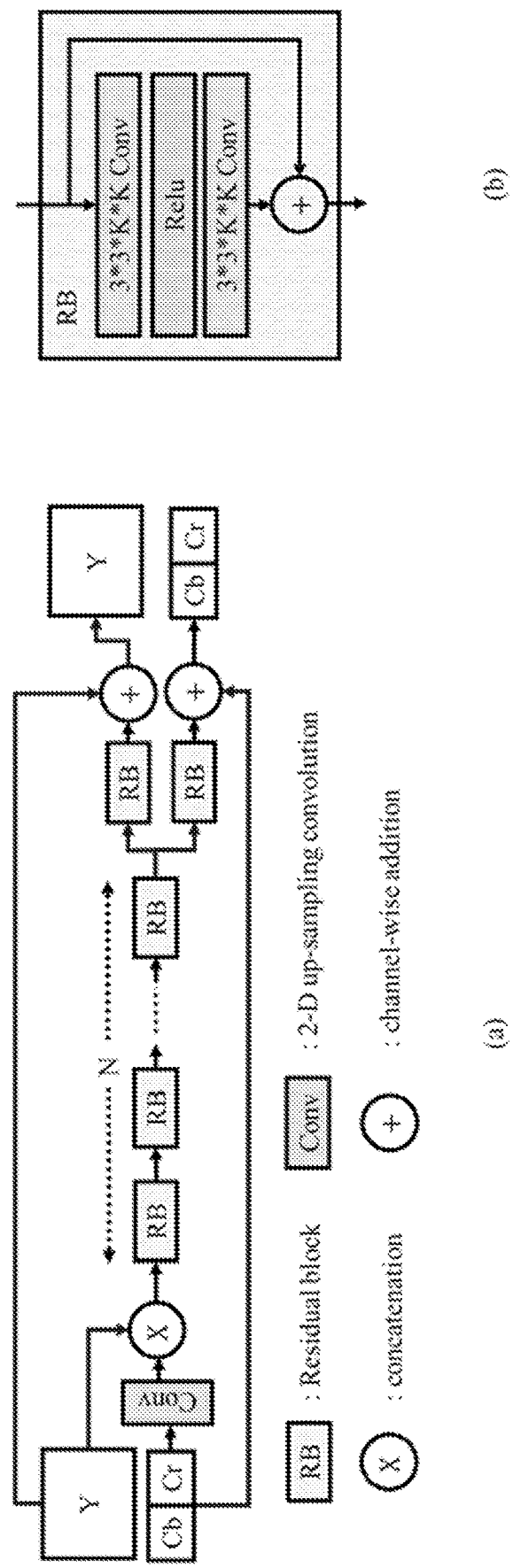
FIG. 23 is a block diagram illustrating a network architecture of the joint luma-chroma ResNet where the up-sampling and down-sampling are replaced by convolutional modules, in accordance with some implementations of the present disclosure.

In another embodiment, to further improve the performance, filtering operations are introduced to perform the up-sampling and down-sampling of the chroma planes. To achieve different performance/complexity trade-off, different types of up-sampling and down-sampling filters may be applied, e.g., Gaussian filter, Lanczos filter, bilateral filter, and so forth. In the filtering-based method, the filter coefficients are fixed for both up-sampling and down-sampling processes. This may not be optimal considering the varying characteristics of different video content. To solve such issue, in one embodiment, the up-sampling and down-sampling processes are included as parts of the network. FIG. 23 is a block diagram illustrating a network architecture of the joint luma-chroma ResNet where the up-sampling and down-sampling are replaced by convolutional modules, in accordance with some implementations of the present disclosure. Specifically, as shown in FIG. 23, 2 convolutions are used to replace the original fixed up-sampling and down-sampling operations. Specifically, by such method, the chroma samples are firstly processed by one convolution module which converts one M-by-M chroma block to the same resolution of its corresponding luma block (e.g., 2M-by-2M when 4:2:0 chroma format is applied). Then, the two chroma planes and the luma plane are concatenated together to generate one 3-by-2M-by-2M input feature input. As shown in FIG. 21, the residual block (Resblock or RB) is basic unit of ResNet which usually contains 2 convolutional layers and one activation module, e.g., ReLU.

In some embodiments, an NN-based in-loop filter with input QP information is implemented. In the above methods, one same network structure is used to filter the reconstructed video signals that are coded with different quantization parameters. Meanwhile, in common cases, the network parameters are trained based on a large number of trainings by minimizing one target loss function between the ground-truth pictures and the reconstructed pictures. On the other hand, as shown in FIG. 2, to reduce the signaling overhead, the prediction residuals (e.g., Residual Block as shown in FIG. 2) (i.e., the difference between the original signal and the intra/inter prediction signal) are quantized before being signaling from encoder to decoder. In both the HEVC and the VVC, the relationship between the quantization parameter (QP) and the actual quantization step size $Q_{ctep}$ is $Q_{ctep}=2^{(QP-4)/6}$. Thus, given the quantization step size, one prediction residual sample is quantized by $$p\text{Level} = \text{round}\left(\frac{p\text{Resi}}{Q_{ctep}}\right) = \text{round}\left(\frac{p\text{Resi}}{2^{(QP-4)/6}}\right) \quad (5)$$

At the decoder, the reconstructed residual sample is derived by multiplying the quantization step size with the received quantized coefficient from the bit-stream, which is shown as $$p\text{Rec}=\text{round}(p\text{Level}\cdot Q_{ctep})=\text{round}(p\text{Level}\cdot 2^{(QP-4)/6}) \quad (6)$$

As shown in equations (5) and (6), due to the quantization/de-quantization process, various QP values result in different reconstructed video quality which could significantly affect the parameters of the derived network. In order to further improve the efficiency of the NN-based in-loop filtering, methods and systems are implemented in the following which utilize the QP information as network input such that one single network can better adapt to the reconstructed video signal with different qualities.

Figure 24:
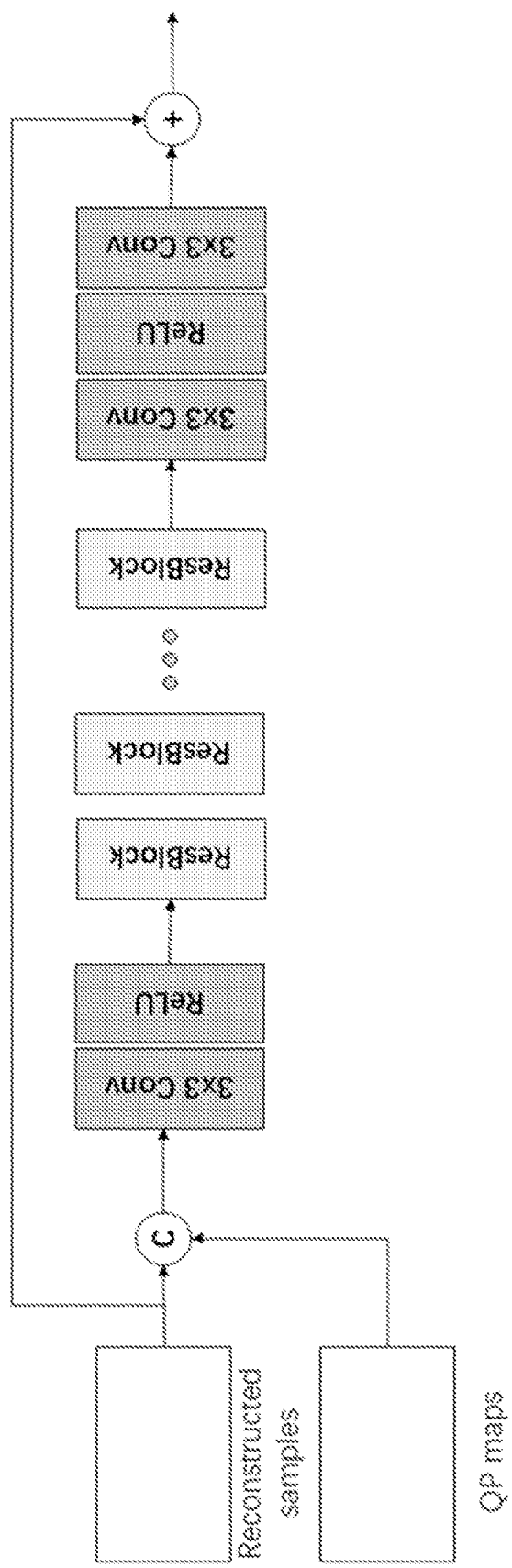
FIG. 24 is a block diagram illustrating a modified ResNet architecture with input QP map, in accordance with some implementations of the present disclosure.

In one embodiment, the normalized QP value is used as one additional network input. Using the traditional ResNet as one example, FIG. 24 shows one example when such method is applied. FIG. 24 is a block diagram illustrating a modified ResNet architecture with input QP map, in accordance with some implementations of the present disclosure. As shown in FIG. 24, the modified ResNet architecture has two inputs: reconstructed samples and QP values (QP maps). Specifically, both the sample values and QP values in the reconstruction sample plane and the QP map plane are normalized to the range of [0, 1] before being connected by the concatenation layer. In more details, each reconstruction sample value P(x, y) and the QP value in the position (x, y) of the two planes are normalized by the following equations:

$$P^{norN}(x,y) = P(x,y)/P_{NAS} \quad (7)$$

$$QP^{norN}(x,y) = QP/QP_{NAS}$$

where $P_{NAS}$ is the maximum of sample values which is equal to $P_{NAS} = 2^{bitdepth} - 1$, where bitdepth is the internal coding bit-depth and $QP_{NAS}$ is the maximum of the allowed input QP values which is equal to 51 in the HEVC and 63 in the VVC.

In another embodiment of the disclosure, instead of using QP value as input to the network, QP step size is used as the input. More specifically, when such method is applied, the input values in the QP map plane to the network are calculated as $$QP_{ctep}^{norN} = QP_{ctep}/QP_{ctep}^{NAS} \quad (8)$$

where $QP_{ctep}^{norN}$ is the normalized value of QP step size and $QP_{ctep}^{NAS}$ is the maximum of the allowed QP step size values which is calculated as depicted as $$QP_{ctep}^{NAS} = 2^{(QP_{NAX}-4)/6} \quad (9)$$

Figure 25:
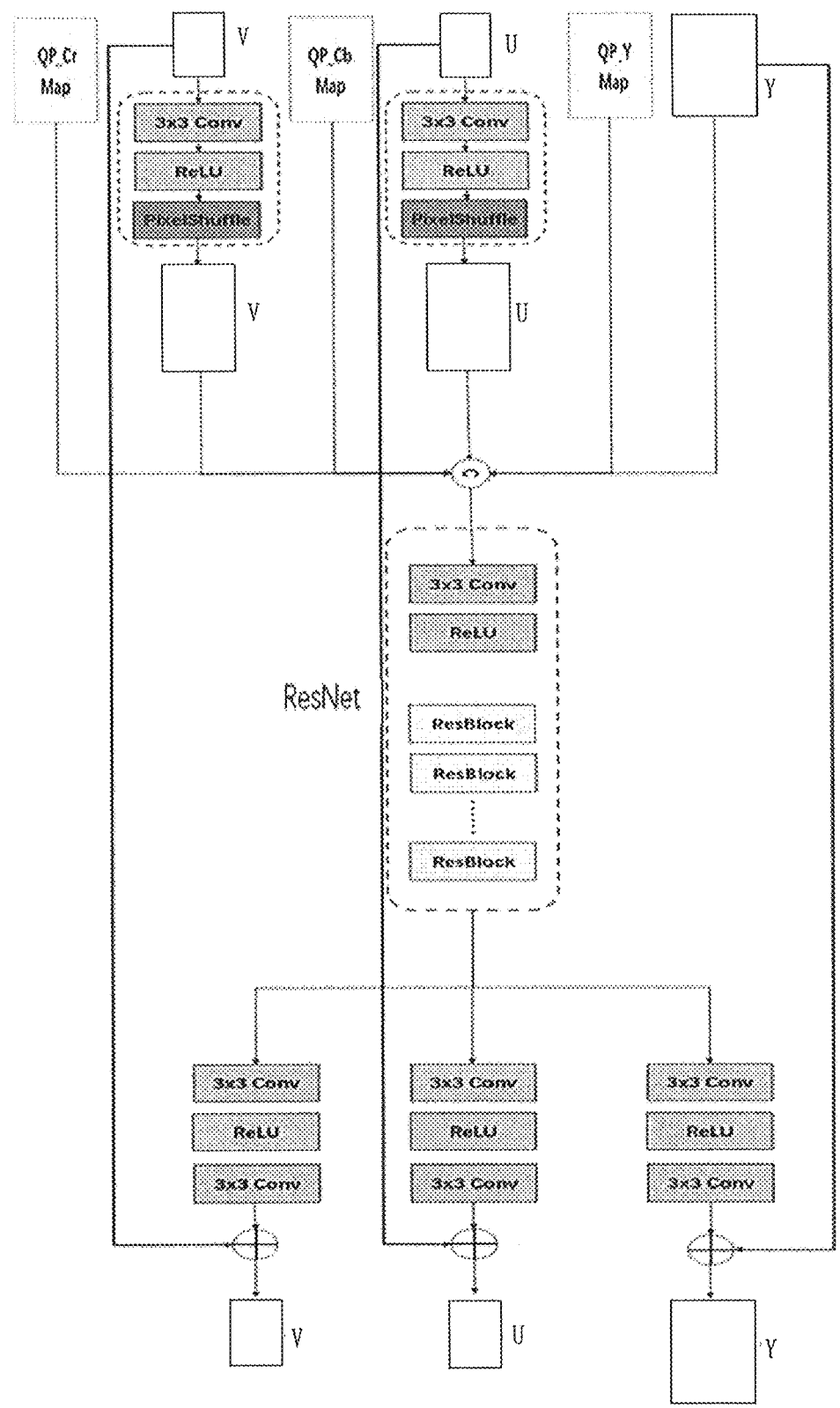
FIG. 25 is a block diagram illustrating Joint luma-chroma ResNet architecture with independent QP map inputs of luma and chroma components, respectively, in accordance with some implementations of the present disclosure.

In the above method, only the QP values of one luma component are considered when designing the NN architecture. Because luma and chroma components are allowed to use different QP values, it is theoretically not feasible to use the same QP value for both luma and chroma in the NN-based in-loop filter process. Based on such consideration, in one embodiment of the disclosure, separate QP maps (each combined with one corresponding color plane) are used as the inputs to the network structure. Using the joint luma-chroma NN structure as one example, FIG. 25 shows the NN architecture when such method is applied. FIG. 25 is a block diagram illustrating Joint luma-chroma ResNet architecture with independent QP map inputs of luma and chroma components, respectively, in accordance with some implementations of the present disclosure. As shown in FIG. 25, three different QP/QP step size maps are generated by using the value of the corresponding QP/QP step size associated with each color component which are then normalized to the range of [0, 1] and concatenated with the corresponding sample plane of the color component. Additionally, at the end of the structure, different sets of convolution and activation modules are applied to three components separately to recover the residuals to the original resolution of each component and generate the output reconstructed samples by adding the original reconstructed samples of the color component.

In some embodiments, NN-based in-loop filtering with on-line or off-line training is implemented. For video/image compression, the ground truth data is always available at the encoder side in both the training and inference processes. This benefit may lead to different optional training modes. To achieve different performance/complexity tradeoff, the following two methods are implemented to notice the network parameters from the encoder to the decoder.

In one embodiment, online training is used in which the model parameters trained from one reconstructed image/video frame may be used for inference of the same image/video frame. In this case, the trained model parameters may need to be signaled to the decoder explicitly. And the whole training process needs to keep going on for each encoded image/video frame, which can be considered as online training. In one example, the online training mode may be used when the neural network model works as a post-processing tool in order to enhance image/video quality after a video codec.

In another embodiment, offline training is used in which the model parameters trained from the reconstructed images/video frames may be used for inference of the same or different images/video frames. In this case, the model parameters may be trained and saved offline, and loaded in difference future cases as needed. In one example, the offline training mode may be used when the neural network model works as an in-loop filtering tool, allowing the images/video frames with enhanced quality after the model inference process to be used as the reference pictures/frames.

In some embodiments, other consideration aspects are further described below when designing NN-based in-loop filters.

In a first embodiment, depth selection is implemented. The number of convolutional layers may be selected to reflect different considerations. For online training, the trained model parameters may need to be signaled and the number of convolutional layers is desired to be small to limit the signaling overhead. Besides, small number of convolutional layers are easier to be trained. In this case, overfitting may not be problem. If the spatial resolution of the input data is known to be trivial (flat region, or small variations) or small amount of data, the number of convolutional layers is desired to be small such that the model size is smaller and more efficient for loading and inference.

In a second embodiment, activation layer selection is implemented. If Relu function is originally selected, alternative versions of Relu function may be used. For example, if the input data is zero-centered during the data preprocessing, some input data may have negative input. In order to avoid dead Relu (e.g., not activated due to zero gradients), certain variations of the Relu function such as Leaky Relu may be used.

In a third embodiment, a quality metric is implemented. Compared to PSNR, nowadays, several perceptual video quality assessment metrics such as structural similarity (SSIM), video multimethod assessment fusion (VMAF) and so forth are reported that may better represent visual quality. In one embodiment, PSNR and SSIM/VMAF may be combined to be used to loss function design for the neural network model disclosed herein. In one embodiment, PSNR may be used in the first stage of training, and SSIM, MS-SSIM, VMAF or other perceptual evaluation metrics may be used in the second stage of training. And the first and second stage may or may not be repeated with regard to the whole training process. In another embodiment, PSNR and SSIM (or MS-SSIM, VMAF) may be used depending on the specific scenarios. For example, PSNR may be used at the beginning epochs to quickly reduce the training loss, and SSIM may be used at the remaining epochs when PSNR based training loss is relatively stable.

In a fourth embodiment, data augmentation is implemented. Training data may be augmented in different ways to enrich data variations for better model generalization. The trained neural network model is only as good as the training data. In some examples, data augmentation may be achieved by traditional transformations such as flip, rotation, scaling up or down, crop, translation and/or dynamic addition of Gaussian noise. In some examples, data augmentation may be achieved by online or offline augmentation. For relatively smaller data sets, offline augmentation may be desired. For relatively large data sets, online augmentation may be desired, such as for different batches. In some instance, the online augmentation is better to be accelerated on the GPU.

In a fifth embodiment, converging granularity control is implemented. To achieve a good and also quick training process, the learning rate is an important hyper parameter to control the convergence granularity.

From the mode parameter perspective, a selected optimizer (e.g., Adam) may be used to maintain a learning rate for each network parameter and separately adapted as learning unfolds. The learning rate of a selected optimizer (e.g., Adam) may be set according to the QP of the trained images/video frames. In the case of higher QP, the learning rate value may use a higher value due to larger loss at the beginning. The learning rate of a selected optimizer (e.g., Adam) may be set according to the content of the trained images/video frames. In the case of trivial image/frame content, higher learning rate value may be used. The beta1 and beta2 of Adam may be set according to the content of the trained images/video frames. For example, the beta1 and beta2 of Adam may be set to a lower value (e.g., from 0.9 to 0.8) if the content of the trained images/video frames contains more details/edges/movements. The beta1 and beta2 of Adam may be set according to the sparseness of the gradient distribution within the trained images/video frames.

From the training iteration perspective, the learning rate of a selected optimizer (e.g., Adam) may be adjusted based on the number of iterations/epochs. For example, at the first few epochs, the learning rate may be set to be a bigger value such that the initial training loss could be quickly reduced. While at the later few epochs, the learning rate may be set to be a smaller value.

In a sixth embodiment, overfitting control is implemented. In most cases, model generalization is a preferred outcome of the training process. In this cases, different regularization methods may be applied. For example, in order to prevent overfitting, some terms are intentionally added into the loss functions, and these terms can be L1 or L2 regularizations. For another example, dropout method may be used to randomly set some neurons to be zero such that the trained network could have a redundant (robust) representation. The dropout probability may be set according to the image/video frame content. In some cases, model generalization is not needed since the trained model is expected to be applied within a small scope. For example, for online training, the trained model parameters are supposed to be updated from time to time, and each update is applied to a specific image/video frame. In this case, overfitting is desired to minimize the image coding residuals. In some cases, a hybrid combination of the above two control methods may be applied. For example, at the beginning of the training, data fitting is desired and those overfitting avoiding methods are not active. At the later part of the training, those overfitting avoiding methods are turned on.

In a seventh embodiment, overlapping control is implemented. To mitigate the artifacts or discontinuity at the coded block boundaries, at the inference process, each image/video frame is segmented into multiple overlapping image/frame blocks (e.g., with spatial resolution as a CTU size). The overlap size may be a predefined range (e.g., 4 to 12 pixels at each side), while the specific overlap size selected for each image/frame may depend on the image/frame content, or blocks' width and height ratio or the image/frame width and height.

In an eighth embodiment, flag signaling is implemented. When the inference process is applied on each segmented image/frame block, the output may have better or worse quality (e.g., PSNR, VMAF or SSIM value). A flag to indicate whether this block needs inference process at the decoder side is signaled to the decoder. To save the signaling overhead in case most segmented blocks of an image/frame have the flag turned on or off, another one or two frame/image level flag(s) is/are signaled as well. For example, if the frame/image level flag which indicates on is equal to 1, it means all the blocks will apply the inference. While if the frame/image level flag which indicates off is equal to 1, it means all the blocks will not apply the inference. In either case, the block level flags may not be transmitted to save signaling.

In a ninth embodiment, offset control is implemented. During the inference process, if the model parameter is represented as floating (non-integer) value, the processed samples in each image/frame may be a floating value as well. In order to represent integer sample value, a rounding procedure is needed. In this case, the offset value used at rounding process is needed. This offset value may be signaled or not signaled in the encoded bit streams. In some examples, the offset value may be fixed value, such as 0.5. In some examples, the offset value may be determined at the encoder side with different resolution value.

Last but not least, though in the above descriptions the ResNet is used as example for explanations, the systems and methods in this disclosure can be freely applied to different NN-based network structures.

FIG. 26 is a flowchart illustrating an exemplary process 2600 of decoding video signal using a neural network based in-loop filter, in accordance with some implementations of the present disclosure.

The video decoder 30 (as shown in FIG. 3), reconstructs, from a video bitstream, a picture frame that includes a luma component, a first chroma component, and a second chroma component (2610).

The video decoder 30 applies a trained neural network based in-loop filter to the reconstructed picture frame (2620) by: concatenating the samples of at least one of the first and the second chroma components with the luma component to create concatenated samples (2620-2); and processing the concatenated samples using a convolutional neural network (2620-3).

In some embodiments, applying the trained neural network based in-loop filter to the reconstructed picture frame (2620) further comprises: converting a first resolution of the samples of the at least one of the first and the second chroma components to a second resolution of the samples of the luma component when the first resolution of the at least one of the first and the second chroma components is different from the second resolution of the luma component (2620-1); and reconverting the samples of the at least one of the first and the second chroma components processed by the convolutional neural network from the second resolution back to the first resolution (2620-4).

In some embodiments, the converting the first resolution of the samples of the at least one of the first and the second chroma components to a second resolution of the samples of the luma component (2620-1), comprises: up-sampling the samples of at least one of the first and the second chroma components from the first resolution to the second resolution of the samples of the luma component, and wherein the reconverting the samples of the at least one of the first and the second chroma components processed by the convolutional neural network from the second resolution back to the first resolution (2620-4) comprises: down-sampling the samples of the at least one of the first and the second chroma components processed by the convolutional neural network from the second resolution back to the first resolution.

It is to be understood that the scope of claims is not to be limited to the specific examples of the implementations disclosed and that modifications and other implementations are intended to reconvert the samples of the at least one of the first and the second chroma components processed by the convolutional neural network from the second resolution back to the first resolution.

In some embodiments, applying the trained neural network based in-loop filter to the reconstructed picture frame (2620) further comprises: feeding quantization parameter (QP) information of prediction residuals as an additional input to the convolutional network. In some embodiments, the QP information is normalized QP value.

In some embodiments, the QP information is QP step size.

In some embodiments, the QP information is QP maps, and each of the QP maps is combined with a corresponding color plane of the luma component, the first chroma component, and the second chroma component, respectively.

In some embodiments, the neural network based in-loop filter is trained to obtain model parameters by reducing difference between output reconstructed picture frames from the convolutional neural network and corresponding ground-truth picture frames. In some embodiments, the corresponding ground-truth picture frames are available at an encoder. In some embodiments, the model parameters are explicitly signaled from the encoder to a decoder.

In some embodiments, the neural network based in-loop filter is trained for each encoded picture frame and updated frequently.

In some embodiments, the neural network based in-loop filter is trained for each encoded picture frame and updated frequently with overfitting enabled.

In some embodiments, the neural network based in-loop filter is trained and saved offline for next use.

In some embodiments, the neural network based in-loop filter is trained and saved offline for next use with overfitting disabled.

In some embodiments, the converting and the reconverting are processed by convolution modules.

In some embodiments, the up-sampling and the down-sampling are processed by convolution modules.

In some embodiments, the neural network based in-loop filter is trained from reconstructed picture frame training data with a deblocking filter applied.

In some embodiments, the neural network based in-loop filter is trained from reconstructed picture frame training data without a deblocking filter applied.

In some embodiments, applying the trained neural network based in-loop filter to the reconstructed picture frame (2620) further comprises: segmenting the reconstructed picture frame into a plurality of overlapping blocks, wherein an overlapping size of the overlapping blocks is selected according to one or more of a content of the reconstructed picture frame, width to height ratio of the overlapping blocks, and width to height ratio of the reconstructed picture frame.

In some embodiments, applying the trained neural network based in-loop filter to the reconstructed picture frame (2620) further comprises: rounding sample values at an output of the convolutional neural network by applying an offset value, wherein the offset value is a fixed value or a value signaled and determined from an encoder.

In some embodiments, the convolutional neural network is ResNet.

Further embodiments also include various subsets of the above embodiments combined or otherwise re-arranged in various other embodiments.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the implementations described in the present application. A computer program product may include a computer-readable medium.

The terminology used in the description of the implementations herein is for the purpose of describing particular implementations only and is not intended to limit the scope of claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, elements, and/or components, but do not preclude the presence or addition of one or more other features, elements, components, and/or groups thereof.

It will also be understood that, although the terms first, second, etc. may be used herein to describe various elements, these elements should not be limited by these terms. These terms are only used to distinguish one element from another. For example, a first electrode could be termed a second electrode, and, similarly, a second electrode could be termed a first electrode, without departing from the scope of the implementations. The first electrode and the second electrode are both electrodes, but they are not the same electrode.

Reference throughout this specification to "one example," "an example," "exemplary example," or the like in the singular or plural means that one or more particular features, structures, or characteristics described in connection with an example is included in at least one example of the present disclosure. Thus, the appearances of the phrases "in one example" or "in an example," "in an exemplary example," or the like in the singular or plural in various places throughout this specification are not necessarily all referring to the same example. Furthermore, the particular features, structures, or characteristics in one or more examples may include combined in any suitable manner.

The description of the present application has been presented for purposes of illustration and description, and is not intended to be exhaustive or limited to the invention in the form disclosed. Many modifications, variations, and alternative implementations will be apparent to those of ordinary skill in the art having the benefit of the teachings presented in the foregoing descriptions and the associated drawings. The embodiment was chosen and described in order to best explain the principles of the invention, the practical application, and to enable others skilled in the art to understand the invention for various implementations and to best utilize the underlying principles and various implementations with various modifications as are suited to the particular use contemplated. Therefore, it is to be understood that the scope of claims is not to be limited to the specific examples of the implementations disclosed and that modifications and other implementations are intended to be included within the scope of the appended claims.

What is claimed is:

1. A method of decoding video data, comprising:
   reconstructing, from a video bitstream, a picture frame that includes a luma component, a first chroma component, and a second chroma component, and
   applying a trained neural network based in-loop filter to the reconstructed picture frame by performing operations comprising:
      concatenating samples of at least one of the first and the second chroma components with the luma component to create concatenated samples; and
      processing the concatenated samples using a convolutional neural network
   wherein the trained neural network based in-loop filter has been trained to obtain model parameters by reducing difference between output reconstructed picture frames from the convolutional neural network and corresponding ground-truth picture frames,
   wherein applying the trained neural network based in-loop filter to the reconstructed picture frame further comprises:
   converting a first resolution of the samples of the at least one of the first and the second chroma components to a second resolution of the samples of the luma component when the first resolution of the at least one of the first and the second chroma components is different from the second resolution of the luma component; and
   reconverting the samples of the at least one of the first and the second chroma components processed by the convolutional neural network from the second resolution back to the first resolution.

2. The method according to claim 1, wherein the converting the first resolution of the samples of the at least one of the first and the second chroma components to a second resolution of the samples of the luma component, comprises:
   up-sampling the samples of at least one of the first and the second chroma components from the first resolution to the second resolution of the samples of the luma component, and
   wherein the reconverting the samples of the at least one of the first and the second chroma components processed by the convolutional neural network from the second resolution back to the first resolution comprises:
   down-sampling the samples of the at least one of the first and the second chroma components processed by the convolutional neural network from the second resolution back to the first resolution.

3. The method according to claim 1, wherein applying the trained neural network based in-loop filter to the reconstructed picture frame further comprises:
   feeding quantization parameter (QP) information of prediction residuals as an additional input to the convolutional neural network.

4. The method according to claim 3, wherein the QP information is normalized QP value, or
   the QP information is QP step size, or
   the QP information is QP maps, each of the QP maps combined with a corresponding color plane of the luma component, the first chroma component, and the second chroma component, respectively.

5. The method according to claim 1, wherein the corresponding ground-truth picture frames are available at an encoder.

6. The method according to claim 5, wherein the model parameters are explicitly signaled from the encoder to a decoder.

7. The method according to claim 1, wherein the trained neural network based in-loop filter has been trained for each encoded picture frame and updated frequently.

8. The method according to claim 1, wherein the trained neural network based in-loop filter has been trained for each encoded picture frame and updated frequently with overfitting enabled.

9. The method according to claim 1, wherein the trained neural network based in-loop filter has been trained and saved offline for next use.

10. The method according to claim 1, wherein the trained neural network based in-loop filter is-has been trained and saved offline for next use with overfitting disabled.

11. The method according to claim 1, wherein the converting and the reconverting are processed by convolution modules.

12. The method according to claim 1, wherein the trained neural network based in-loop filter has been trained from reconstructed picture frame training data with a deblocking filter applied.

13. The method according to claim 1, wherein the trained neural network based in-loop filter has been trained from reconstructed picture frame training data without a deblocking filter applied.

14. The method according to claim 1, wherein applying the trained neural network based in-loop filter to the reconstructed picture frame further comprises: segmenting the reconstructed picture frame into a plurality of overlapping blocks, wherein an overlapping size of the overlapping blocks is selected according to one or more of a content of the reconstructed picture frame, width to height ratio of the overlapping blocks, and width to height ratio of the reconstructed picture frame.

15. The method according to claim 1, wherein applying the trained neural network based in-loop filter to the reconstructed picture frame further comprises: rounding sample values at an output of the neural network by applying an offset value, wherein the offset value is a fixed value or a value signaled and determined from an encoder.

16. The method according to claim 1, wherein the convolutional neural network is ResNet.

17. An electronic apparatus comprising:
    one or more processing units;
    memory coupled to the one or more processing units; and
    a plurality of programs stored in the memory that, when executed by the one or more processing units, cause the electronic apparatus to perform decoding video data by performing operations comprising:

reconstructing, from a video bitstream, a picture frame that includes a luma component, a first chroma component, and a second chroma component, and applying a trained neural network based in-loop filter to the reconstructed picture frame by performing operations comprising:

concatenating samples of at least one of the first and the second chroma components with the luma component to create concatenated samples; and processing the concatenated samples using a convolutional neural network, wherein the trained neural network based in-loop filter has been trained to obtain model parameters by reducing difference between output reconstructed picture frames from the convolutional neural network and corresponding ground-truth picture frames, wherein applying the trained neural network based in-loop filter to the reconstructed picture frame further comprises:

converting a first resolution of the samples of the at least one of the first and the second chroma components to a second resolution of the samples of the luma component when the first resolution of the at least one of the first and the second chroma components is different from the second resolution of the luma component; and reconverting the samples of the at least one of the first and the second chroma components processed by the convolutional neural network from the second resolution back to the first resolution.

18. A non-transitory computer readable storage medium storing a plurality of programs for execution by an electronic apparatus having one or more processing units, wherein the plurality of programs, when executed by the one or more processing units, cause the electronic apparatus to perform decoding video data comprising by performing operations comprising:

reconstructing, from a video bitstream, a picture frame that includes a luma component, a first chroma component, and a second chroma component, and applying a trained neural network based in-loop filter to the reconstructed picture frame by performing operations comprising:

concatenating samples of at least one of the first and the second chroma components with the luma component to create concatenated samples; and processing the concatenated samples using a convolutional neural network wherein the trained neural network based in-loop filter has been trained to obtain model parameters by reducing difference between output reconstructed picture frames from the convolutional neural network and corresponding ground-truth picture frames, wherein applying the trained neural network based in-loop filter to the reconstructed picture frame further comprises:

converting a first resolution of the samples of the at least one of the first and the second chroma components to a second resolution of the samples of the luma component when the first resolution of the at least one of the first and the second chroma components is different from the second resolution of the luma component; and reconverting the samples of the at least one of the first and the second chroma components processed by the convolutional neural network from the second resolution back to the first resolution.

\* \* \* \* \*